(12) United States Patent
Fujii et al.

(10) Patent No.: US 9,205,495 B2
(45) Date of Patent: Dec. 8, 2015

(54) CUTTING INSERT, CUTTING TOOL, AND METHOD OF MANUFACTURING MACHINED PRODUCT USING THEM

(75) Inventors: Kanenori Fujii, Omihachiman (JP); Yoshihiro Inoue, Omihachiman (JP)

(73) Assignee: Kyocera Corporation, Kyoto (JP)

( * ) Notice: Subject to any disclaimer, the term of this patent is extended or adjusted under 35 U.S.C. 154(b) by 178 days.

(21) Appl. No.: 14/001,999

(22) PCT Filed: Jan. 30, 2012

(86) PCT No.: PCT/JP2012/052004
§ 371 (c)(1),
(2), (4) Date: Sep. 4, 2013

(87) PCT Pub. No.: WO2012/117791
PCT Pub. Date: Sep. 7, 2012

(65) Prior Publication Data
US 2014/0290450 A1    Oct. 2, 2014

(30) Foreign Application Priority Data

Feb. 28, 2011  (JP) ................................. 2011-041123
Mar. 30, 2011  (JP) ................................. 2011-074842

(51) Int. Cl.
*B23B 27/04* (2006.01)
*B23B 27/16* (2006.01)
(Continued)

(52) U.S. Cl.
CPC ........... *B23B 27/1611* (2013.01); *B23B 27/045* (2013.01); *B23B 27/22* (2013.01);
(Continued)

(58) Field of Classification Search
CPC .......................... B23B 27/045; B23B 220/081

USPC ............................ 82/1.11; 407/107, 108, 109
See application file for complete search history.

(56) References Cited

U.S. PATENT DOCUMENTS 4,969,779 A * 11/1990 Barten .......................... 407/114
4,992,008 A *  2/1991 Pano ............................. 407/114
(Continued)

FOREIGN PATENT DOCUMENTS

CN       1041304 A      4/1990
CN     101274372 A    10/2008
(Continued)

OTHER PUBLICATIONS

Chinese Office Action with English concise explanation, Chinese Patent Application No. 201280008827.6, Dec. 31, 2014, 13 pgs.
(Continued)

*Primary Examiner* — Will Fridie, Jr.
(74) *Attorney, Agent, or Firm* — Volpe and Koenig, P.C.

(57) ABSTRACT

In a cutting insert according to an embodiment of the present invention, an upper surface includes: a first concave groove which is continuous with a first cutting edge and extends along a longitudinal direction; a pair of second concave grooves which are respectively continuous with a pair of second cutting edges and extend along the longitudinal direction; and a pair of protruded parts respectively located between the first concave groove and the pair of second concave grooves. The pair of protruded parts are respectively continuous with an end surface cutting edge and are separated from each other by a larger distance therebetween as separating from the end surface cutting edge. A cutting tool with the cutting insert, and a method of manufacturing a machined product by using the cutting tool are also provided.

18 Claims, 21 Drawing Sheets

(51) Int. Cl.
*B23B 27/22* (2006.01)
*B23B 27/00* (2006.01)

(52) U.S. Cl.
CPC ..... *B23B2200/081* (2013.01); *B23B 2200/087* (2013.01); *B23B 2200/32* (2013.01); *B23B 2210/00* (2013.01); *B23B 2220/12* (2013.01); *B23B 2220/126* (2013.01); *Y10T 82/10* (2015.01); *Y10T 407/2268* (2015.01); *Y10T 407/235* (2015.01)

(56) References Cited

U.S. PATENT DOCUMENTS

| | | | | |
|---|---|---|---|---|
| 5,375,948 | A | | 12/1994 | Lindstedt |
| 5,676,495 | A | * | 10/1997 | Katbi et al. ............. 407/114 |
| 5,827,017 | A | | 10/1998 | Tagstrom et al. |
| 5,975,812 | A | * | 11/1999 | Friedman ............... 407/114 |
| 6,238,147 | B1 | * | 5/2001 | Tagtstrom et al. ......... 407/117 |
| 7,510,355 | B2 | * | 3/2009 | Havrda .................. 407/116 |
| 2001/0014259 | A1 | * | 8/2001 | Inayama ................. 407/116 |
| 2008/0240874 | A1 | * | 10/2008 | Nagaya et al. ............ 407/113 |
| 2009/0092453 | A1 | * | 4/2009 | Jonsson ................. 407/108 |
| 2013/0192431 | A1 | * | 8/2013 | Inoue ................... 82/1.11 |

FOREIGN PATENT DOCUMENTS

| | | |
|---|---|---|
| EP | 0310239 A | 8/1988 |
| EP | 0568512 A1 | 4/1993 |
| EP | 0775544 A1 | 11/1996 |
| EP | 1980348 A2 | 3/2008 |
| JP | 01-115503 A | 5/1989 |
| JP | 06-008013 A | 1/1994 |
| JP | 09-174308 A | 7/1997 |
| JP | 2003-245805 A | 9/2003 |
| JP | 2008-272923 A | 11/2008 |

OTHER PUBLICATIONS

Extended European Search Report, European Patent Application No. 12751877.7, Mar. 20, 2015, 4 pgs.

Mikhailov, S.V., et al., "Shaping the Tightly Packed Rolls of Chips in Grooving and Parting-Off Operations," Russian Engineering Research, Allerton Press, New York, NY, US, vol. 15, No. 6, Jun. 1, 1995, pp. 70-74.

Japanese Office Action with Statement of Relevance of Non-English References, Japanese Patent Appln. No. 2013-502218, May 27, 2014, 3 pp.

* cited by examiner

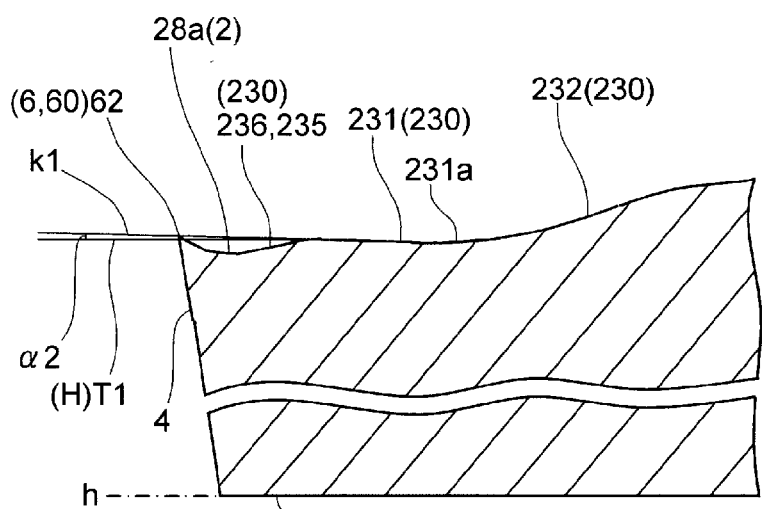
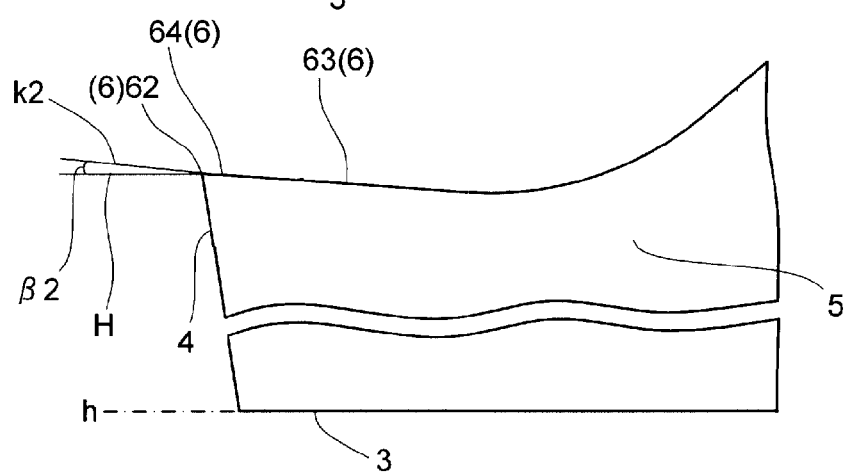
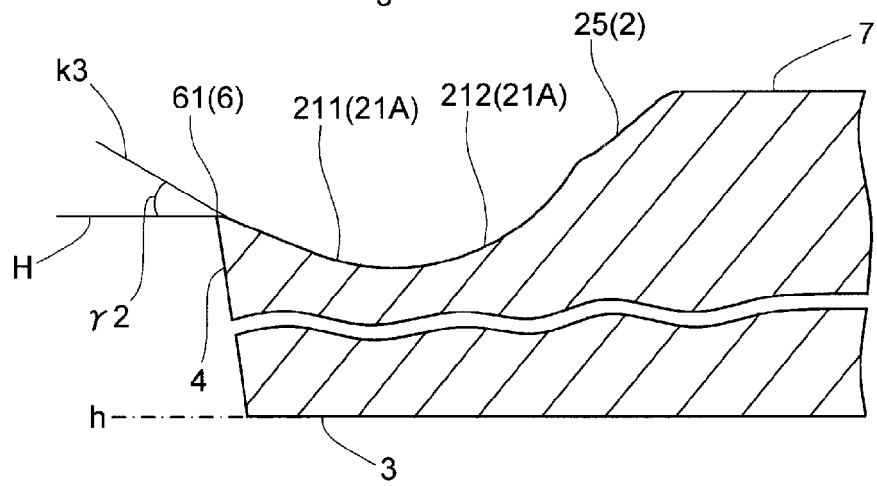

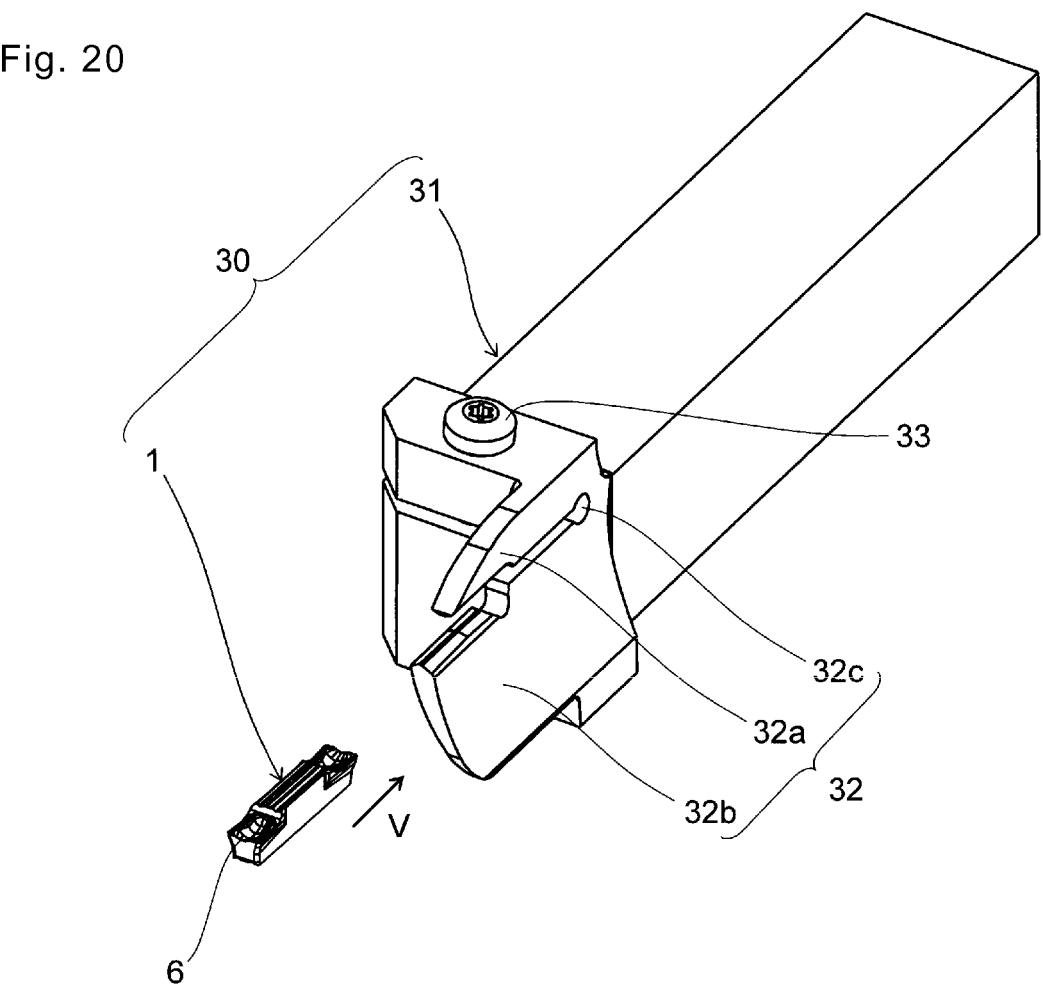

CUTTING INSERT, CUTTING TOOL, AND METHOD OF MANUFACTURING MACHINED PRODUCT USING THEM

TECHNICAL FIELD

The present invention relates to a cutting insert, a cutting tool, and a method of manufacturing a machined product using the cutting insert and the cutting tool.

BACKGROUND ART

Various functions of forming a machined groove (a grooving process), increasing the width of the machined groove (a shoulder grooving process) and the like are required for cutting inserts, particularly cutting inserts for the grooving process. Therefore, various attempts have been made to provide a cutting insert configured to have shapes suitable for the individual functions. Japanese Unexamined Patent Publication No. 9-174308 discloses a cutting insert made up of a shaft part and a cutting head. The cutting head includes a major cutting edge having an edge part held down into a curve-like shape, and a pair of ridges extending in a longitudinal direction on a top surface of the cutting head. According to this configuration, chips generated by the major cutting edge in the grooving process are discharged by being curved between the pair of ridges and compressed in a width direction of the chips.

However, this type of cutting insert needs to ensure a large distance between the pair of ridges in order to satisfactorily curve the chips in the width direction in the grooving process as described above. On the other hand, only an end side of the major cutting edge is used to increase the width of a machined groove in the shoulder grooving process. It is therefore necessary to ensure a longer length of the cutting edge located further outward than the ridge part. The foregoing cutting insert is configured so that the distance between the pair of ridges is relatively large and the width of the top surface located further outward than the ridges is small. Consequently, it may be difficult to obtain sufficient performance in the shoulder grooving process.

Also in the foregoing cutting insert, the ridges are formed to become higher as separating from the major cutting edge. Therefore, the chips generated by the major cutting edge can be guided by the ridges, however, it may be difficult to control the chips because the curling diameter of the chips is increased. Hence, the discharge direction of the chips becomes unstable, that is, the chips travel while causing lateral vibration. As a result, the curled chips are entwined with each other, and the chips are contacted with a machined surface, thereby deteriorating chip discharge performance and damaging a machined wall surface.

SUMMARY OF THE INVENTION

An object of the present invention is to provide a cutting insert and a cutting tool which are suitable for the grooving process, particularly the shoulder grooving process, as well as a method of manufacturing a machined product using the cutting insert and the cutting tool.

A further object of the present invention is to provide a cutting insert and a cutting tool which are suitable for the grooving process, particularly a face grooving process, as well as a method of manufacturing a machined product using the cutting insert and the cutting tool.

A cutting insert according to an embodiment of the present invention includes: an upper surface; a lower surface; a pair of side surfaces located on both sides in a longitudinal direction; an end surface located at a front end in the longitudinal direction; and a cutting edge located from a first intersecting line of the upper surface and the end surface to a pair of second intersecting lines which are respectively intersecting lines of the upper surface and the pair of side surfaces. The cutting edge includes an end surface cutting edge which is located on the first intersecting line and includes a concave-shaped first cutting edge and a pair of second cutting edges located on both sides of the first cutting edge in an end surface view. The upper surface includes: a first concave groove which is connected to the first cutting edge and extends along the longitudinal direction; a pair of second concave grooves which are respectively connected to the second cutting edges and extend along the longitudinal direction; and a pair of protruded parts respectively located between the first concave groove and the pair of second concave grooves. The pair of protruded parts are respectively continuous with the end surface cutting edge and are separated from each other by a larger distance therebetween as separating from the end surface cutting edge.

A cutting tool according to an embodiment of the present invention includes the foregoing cutting insert, and a holder configured to attach the cutting insert to a front end thereof.

A method of manufacturing a machined product according to an embodiment of the present invention includes rotating a workpiece, bringing the workpiece being rotated and the cutting edge of the cutting tool according to the foregoing embodiment into contact with each other, and separating the cutting tool and the workpiece from each other.

In the cutting insert according to the embodiment of the present invention, the upper surface includes: the first concave groove which is continuous with the first cutting edge and extends along the longitudinal direction; the pair of second concave groove which are respectively continuous with the pair of second cutting edges and extend in the longitudinal direction; and the pair of protruded parts respectively located between the first concave groove and the pair of second concave grooves. The pair of protruded parts are continuous with the end surface cutting edge and are separated from each other by a larger distance therebetween as separating from the end surface cutting edge. Therefore, a middle part length and an end portion length of each of the cutting edges can be adjusted, and a groove continuous with each of the cutting edges can be formed. Consequently, the cutting edge length used for the shoulder grooving process can be sufficiently ensured, and the chip discharge performance both in the grooving process and the shoulder grooving process can be improved.

In the case where each of the pair of protruded parts includes the pair of descending top portions inclined so as to become closer to the lower surface as separating from the end surface cutting edge and where the first concave groove includes the first region which is located between the pair of descending top portions and has a larger depth as separating from the end surface cutting edge in the top view, the chips generated the cutting edge are easily guided to the first concave groove by the pair of protruded parts inclined so as to become closer to the lower surface. Additionally, the first concave groove configured to become deeper facilitates the compression of chips in the width direction thereof, and the chip curling diameter becomes further smaller. This makes it easier to stabilize the chip discharge direction, thereby improving the chip discharge performance.

BRIEF DESCRIPTION OF THE DRAWINGS

FIG. 9(a) is a partially enlarged sectional view on a ridgeline of a protruded part of the cutting insert shown in FIG. 6(c); FIG. 9(b) is a partially enlarged side view of side surface cutting edges of the cutting insert shown in FIG. 6;

FIG. 9(c) is a sectional view taken along line a-a in the cutting insert shown in FIG. 8;

FIG. 20 is a perspective view showing a cutting tool according to an embodiment of the present invention.

PREFERRED EMBODIMENTS FOR CARRYING OUT THE INVENTION

<Cutting Insert>

A cutting insert (hereinafter referred to as "insert" in some cases) according to an embodiment of the present invention is described in details below with reference to FIGS. 1 to 5. The insert of the present embodiment is usable for all of an internal grooving process, an external grooving process, a cut-off process and a face grooving process. The following description is made taking as an example the case of using the insert of the present embodiment in the face grooving process unless otherwise stated.

Figure 1A:
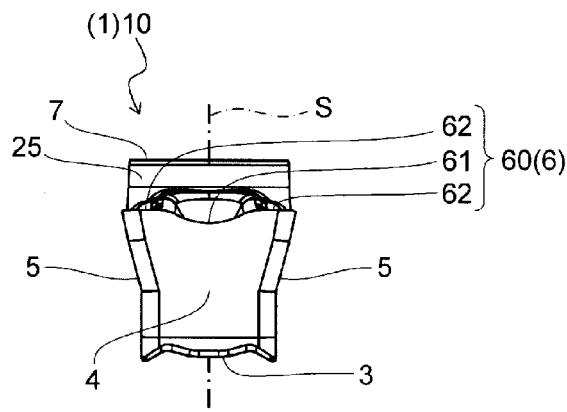
FIG. 1(a) is a front view (end surface view) showing a cutting insert according to an embodiment of the present invention.
Figure 1B:
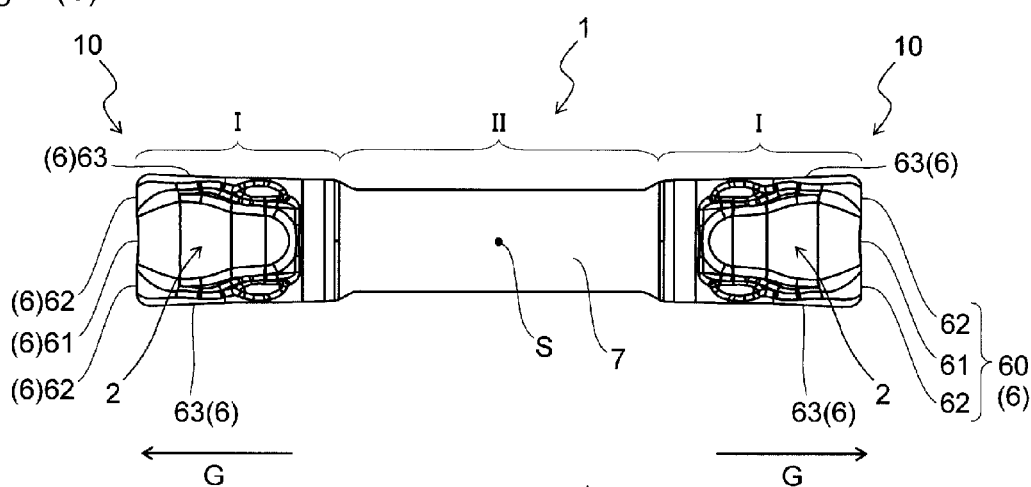
FIG. 1(b) is a plan view (top view) thereof.

As shown in FIG. 1, the insert 1 of the present embodiment has a prism-like shape and includes cutting sections I and I (bodies 10 and 10) located at both ends thereof, and a clamp section II which is located between the cutting sections I and I and has a clamp surface 7 that is brought into contact with a later-described holder 31 when fixed to the holder 31. No limit is imposed on the number of the cutting sections I in the insert 1. In the present embodiment, the pair of cutting sections I is disposed on both ends of the clamp section II in order to improve cutting efficiency.

Some examples of the material of the insert 1 are cemented carbide and cermet. Some examples of the composition of the cemented carbide are WC—Co produced by adding powder of cobalt (Co) to tungsten carbide (WC), followed by sintering, WC—TiC—Co obtained by adding titanium carbide (TiC) to WC—Co, and WC—TiC—TaC—Co obtained by adding tantalum carbide (TaC) to WC—TiC—Co. The cermet is a sintered composite material obtained by complexing metal with ceramic ingredients, and specific examples thereof are titanium compounds composed mainly of titanium carbide (TiC) or titanium nitride (TiN).

The surface of the insert 1 may be coated with a coating film by using chemical vapor deposition (CVD) method or physical vapor deposition (PVD) method. Some examples of the coating film composition are titanium carbide (TiC), titanium nitride (TiN), titanium carbonitride (TiCN) and alumina ($Al_2O_3$).

As shown in FIG. 1, the body 10 (cutting section I) includes an upper surface 2, a lower surface 3, an end surface 4, and a pair of side surfaces 5 and 5. The end surface 4 is connected to each of the upper surface 2 and the lower surface 3, and is located closer to a front end of the body 10 in a longitudinal direction as indicated by a direction of arrow G. The pair of side surfaces 5 and 5 are respectively located on both sides in the longitudinal direction of the body 10. A part of the upper surface 2 functions as a rake surface. A part of the lower surface 3 functions as a mount surface to be mounted onto the holder 31. At least a part of the end surface 4 and a part of the side surfaces 5 function as a flank surface.

Figure 3:
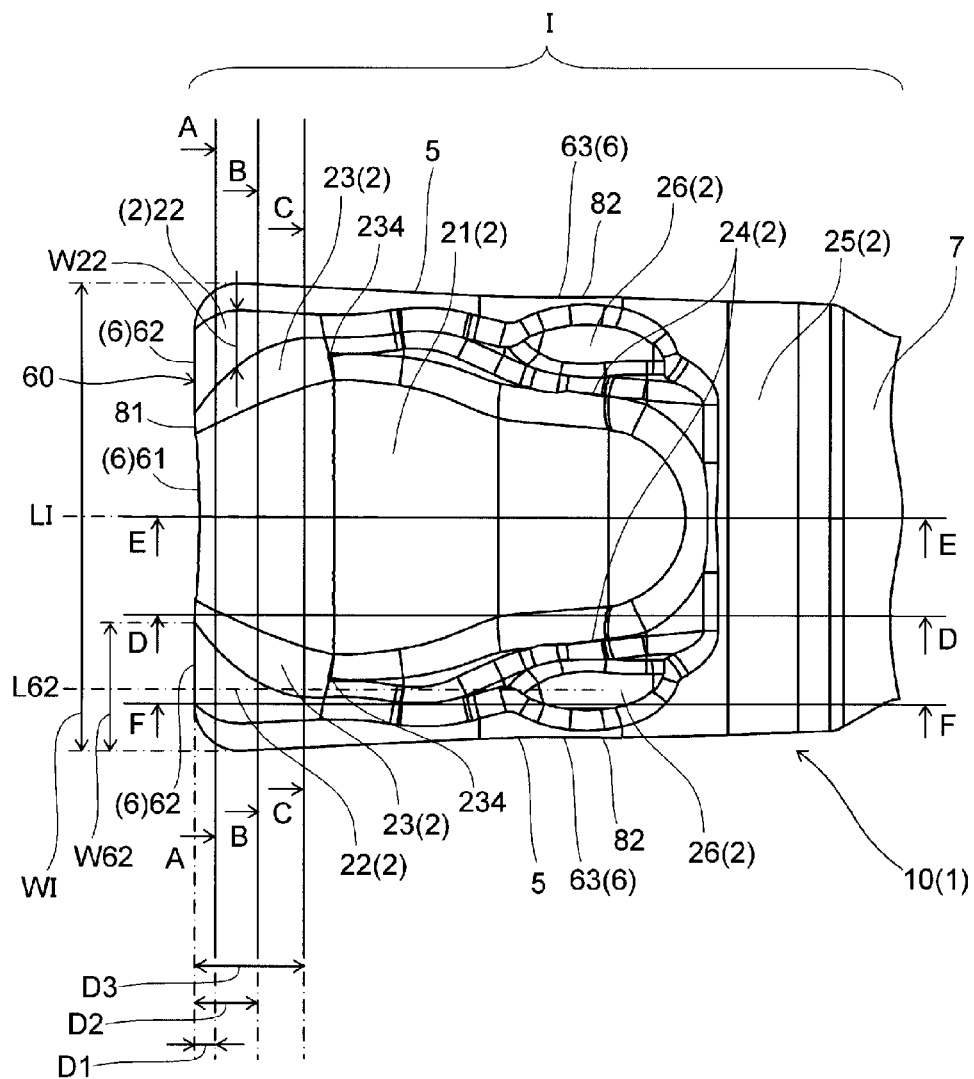
FIG. 3 is a partially enlarged plan view (top view) showing the cutting section I and a part of the clamp section II of the cutting insert shown in FIG. 1.

As shown in FIG. 3, the body 10 of the present embodiment has a rectangular shape having two long sides and two short sides in a top view. The phrase "top view" denotes a state that the insert 1 is viewed from the upper surface 2.

For example, the length of the insert 1 in the longitudinal direction is 18 to 22 mm, and the length of the insert 1 in a width direction perpendicular to the longitudinal direction in the top view is 2 to 6 mm. The length of the insert 1 in the width direction is decreased as becoming closer to the clamp section II so that the insert 1 does not interfere with an inner wall surface of a groove machined in a workpiece during a cutting process. The height of the insert 1 from the lower surface 3 to the upper surface 2 is, for example, 4 to 5 mm. The dimension of the insert 1 is not limited to those described above, but can be properly changed to produce an operation advantage.

Figure 2:
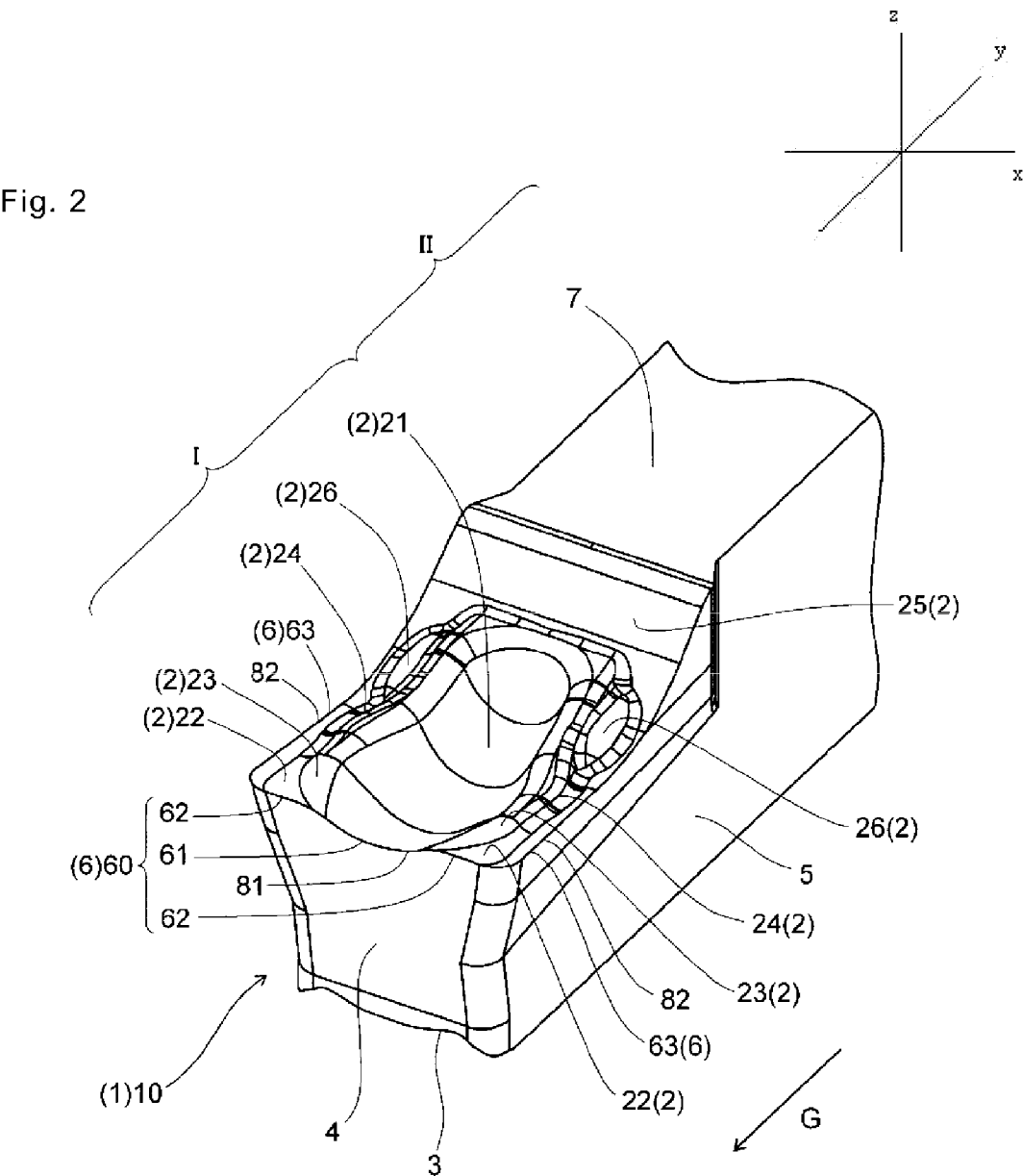
FIG. 2(a) is a partially enlarged perspective view showing a cutting section I and a part of a clamp section II of the cutting insert shown in FIG. 1.

As shown in FIGS. 2 and 3, the body 10 further includes a cutting edge 6 located from a first intersecting line 81 of the upper surface 2 and the end surface 4 to a pair of second intersecting lines 82 and 82 which are respectively intersecting lines of the upper surface 2 and the pair of side surfaces 5 and 5.

In the present embodiment, the cutting edge 6 includes an end surface cutting edge 60 located on the first intersecting line 81 of the upper surface 2 and the end surface 4. The end surface cutting edge 60 includes a concave-shaped first cutting edge 61 and a pair of second cutting edges 61 and 62 respectively located on both sides of the first cutting edge 61. The concave-shaped first cutting edge 61 thus located between the pair of second cutting edges 62 and 62 makes it easier for the chips generated by the first cutting edge 61 and the second cutting edges 62 to be deformed in the width direction of the chips, thereby preventing damage to the machined surface in the grooving process.

In the present embodiment, from the viewpoint of reasonably facilitating the deformation of the chips in the width direction, as shown in FIG. 1(a), the first cutting edge 61 preferably has a curved line shape protruding toward the lower surface 3 and an arc-like shape in an end surface view. As used herein, the phrase "end surface view" denotes a state that the insert 1 is viewed from the end surface 4.

Also in the present embodiment, as shown in FIG. 1(a), the pair of second cutting edges 62 and 62 have a straight line shape in the end surface view. The second cutting edges 62 having the straight line shape allow a bottom surface of a machined groove to be machined into a substantially uniform flat surface, thereby improving accuracy of a finished surface of the bottom surface of the machined groove in the shoulder grooving process. In order to ensure a more satisfactory deformation of the chips in the width direction, the length of the first cutting edge 61 is from one second to two third of the length of the first intersecting line 81 of the upper surface 2 and the end surface 4.

In the present embodiment, as shown in FIGS. 2 and 3, the cutting edge 6 further includes a pair of side surface cutting edges 63 and 63 respectively located on a pair of second intersecting lines 82 and 82 which are respectively intersecting lines of the upper surface 2 and the pair of side surfaces 5 and 5. This configuration allows the insert 1 to be used for a cutting process using the side surface cutting edges 63 (hereinafter referred to as "traversing process"). The side surface cutting edges 63 correspond to third cutting edges.

Figure 1C:
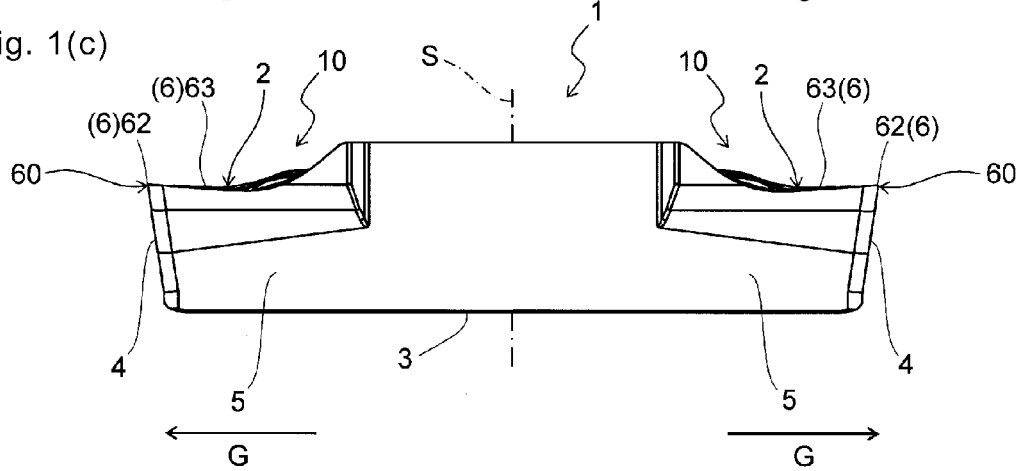
FIG. 1(c) is a side view thereof.

In the present embodiment, as shown in FIG. 1(c), the pair of side surface cutting edges 63 and 63 are inclined so as to become closer to the lower surface 3 as separating from the end surface cutting edge 60 in a side view. This configuration reduces cutting resistance in the side surface cutting edges 63. As used herein, the phrase "side view" denotes a state that the insert 1 is viewed from the side surfaces 5.

As described later, corner cutting edges 64 having an arc-like shape protruding outward of the body 10 in a top view may be respectively disposed at intersections of the second cutting edges 62 and the side surface cutting edges 63. The cutting edge 6 may further include a land on an inward side of the body 10. The term "land" denotes a narrow band-shaped surface with a fixed width disposed along the cutting edge 6. The land is disposed for reducing a fracture of the cutting edge 6.

As shown in FIG. 3, the upper surface 2 includes a first concave groove 21 that is continuous with the first cutting edge 61 and extends along the longitudinal direction of the body 10. This configuration allows the chips generated by the first cutting edge 61 and the second cutting edges 62 to be compressed and deformed in the width direction of the chips in a process of forming a machined groove by using the first cutting edge 61 and the second cutting edges 62 (hereinafter referred to as "grooving process"). Accordingly, the chips generated by the first cutting edge 61 and the second cutting edges 62 are narrower than the width of the body 10 (cutting section I), thereby preventing damage to the machined surface. As used herein, the phrase "width of the body 10 (cutting section I)" denotes a maximum distance between both end parts of the end surface 4 which are continuous with the side surfaces 5 in the end surface view.

Figure 5A:
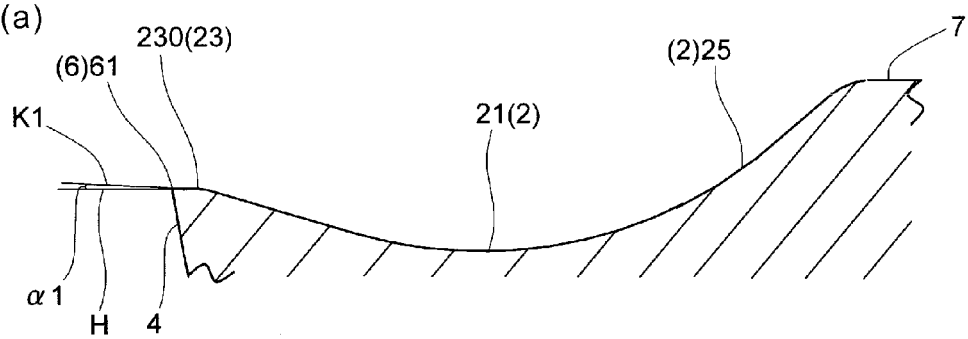
FIG. 5(a) is a sectional view taken along line D-D in the cutting insert shown in FIG. 3.
Figure 5B:
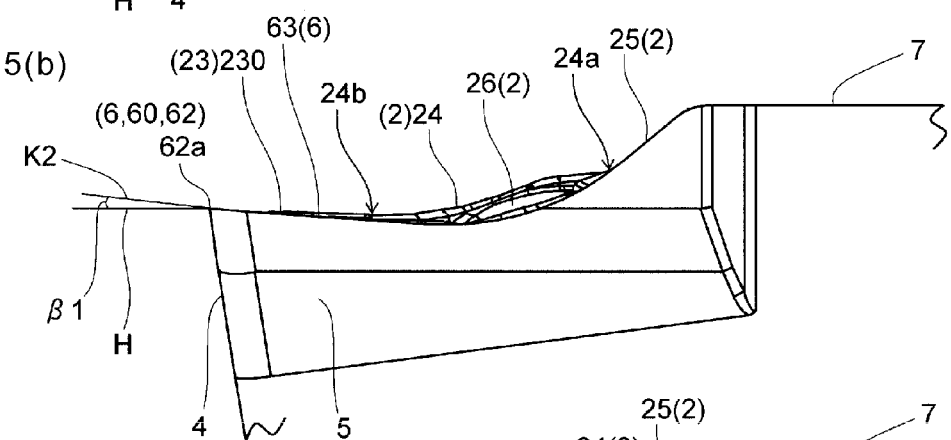
FIG. 5(b) is an enlarged view of a front end portion of the cutting section I of the cutting insert shown in FIG. 1(c)
Figure 5C:
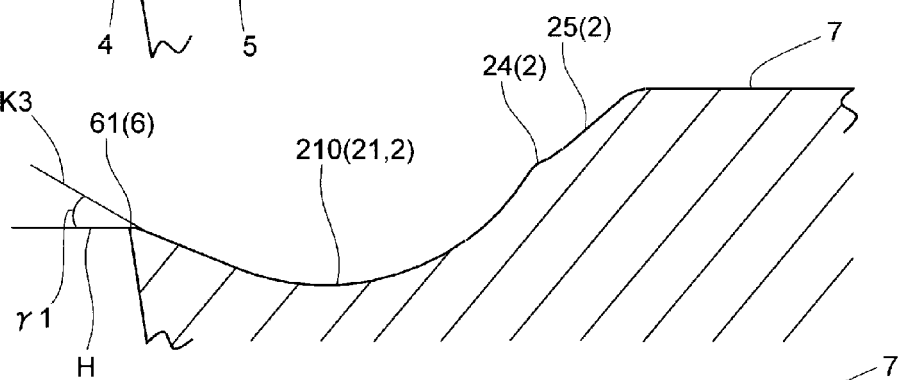
FIG. 5(c) is a sectional view taken along line E-E in the cutting insert shown in FIG. 3.
Figure 5D:
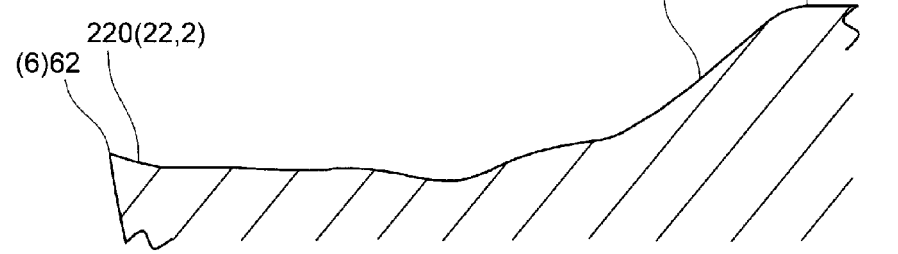
FIG. 5(d) is a sectional view taken along line F-F in the cutting insert shown in FIG. 3.

As shown in FIG. 5(c), a bottom surface 210 of the first concave groove 21 which is continuous with the first cutting edge 61 is inclined so as to become closer to the lower surface 3 as separating from the first cutting edge 61. This configuration makes it easier for the first cutting edge 61 to cut into a workpiece, thereby reducing cutting resistance. Consequently, the relative vibration (hereinafter referred to as "chatter vibration") that occurs between the first cutting edge 61 and the surface of the workpiece can be reduced to improve machining accuracy.

Further in the present embodiment, as shown in FIG. 3, the first concave groove 21 is located on a perpendicular bisector L1 of a line segment W1 equal to the width of the cutting section I in a top view. According to this configuration, the cross section of the chips can be deformed at their middle part into a concave shape, specifically, a substantially laterally symmetric concave shape. Consequently, the balance of the chips in the width direction is enhanced to improve chip discharge performance.

The upper surface 2 further includes a pair of second concave grooves 22 and 22 which are respectively continuous with the pair of second cutting edges 62 and 62 and extend along the longitudinal direction of the body 10. In a process of enlarging the width of the machined groove by using the second cutting edges 62 (hereinafter referred to as "shoulder grooving process"), the second concave grooves 22 have a role in stabilizing a chip discharge direction by compressing the chips generated by the second cutting edges 62 in the width direction of the chips.

In the present embodiment, as shown in FIG. 3, a width W22 of each of the pair of second concave grooves 22 and 22 is decreased as separating from the pair of second cutting edges 62 and 62 in a top view. This configuration allows the discharge direction of the chips generated by the second cutting edges 62 to be easily stabilized at the fixed direction.

Also in the present embodiment, as shown in FIG. 3, the pair of second concave grooves 22 and 22 are curved so as to protrude toward the pair of side surfaces 5 and 5 as separating from the pair of second cutting edges 62 and 62 in the top view. This configuration reduces the tendency that the chips are likely to be discharged to the machined surface by protruded parts 23 described later in the shoulder grooving process. Further, in the traversing process, because the distance between the side surface cutting edges 63 and the second concave groove 22 is further decreased, this configuration allows the second concave grooves to also function as a breaker groove against the chips generated by the side surface cutting edges 63. That is, the curling diameter of the chips generated by the side surface cutting edges 63 can also be satisfactorily controlled.

Figure 4A:
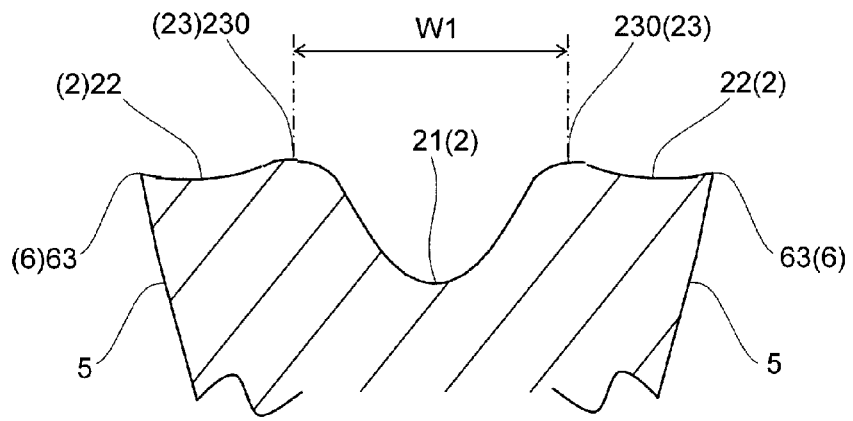
FIG. 4(a) is a sectional view taken along line A-A in the cutting insert shown in FIG. 3.
Figure 4B:
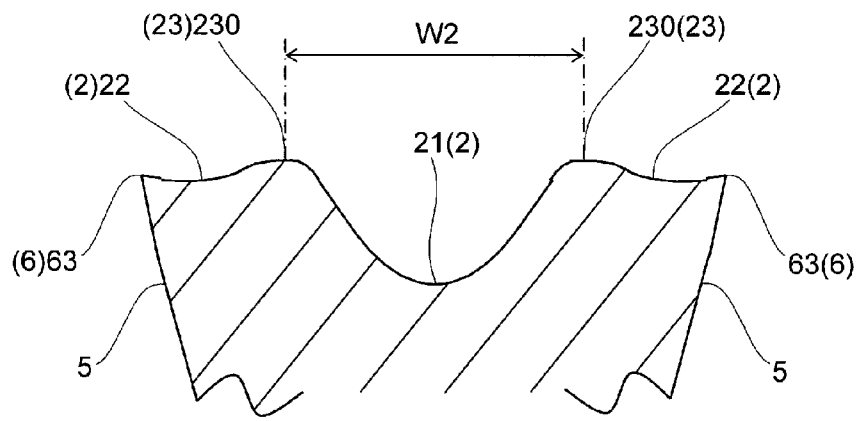
FIG. 4(b) is a sectional view taken along line B-B therein.
Figure 4C:
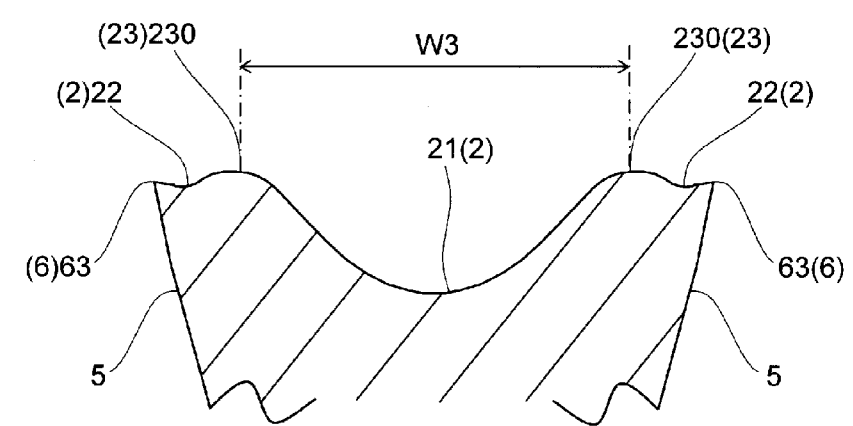
FIG. 4(c) is a sectional view taken along line C-C therein.

In the present embodiment, as shown in FIG. 4, each of the pair of second concave grooves 22 and 22 preferably has a curved line shape protruding toward the lower surface 3, more preferably an arc-like shape in a sectional view parallel to the second cutting edges 62 and perpendicular to the lower surface 3, namely, in a sectional view perpendicular to the foregoing longitudinal direction. This configuration reasonably facilitates the deformation of the chips generated by the second cutting edges 62 in the width direction of the chips.

In the present embodiment, as shown in FIG. 5(*d*), the bottom surface 220 of the second concave groove 22 which is continuous with the second cutting edges 62 is inclined so as to become closer to the lower surface 3 as separating from the second cutting edges 62. This configuration makes it easier for the second cutting edges 62 to cut into the workpiece, thereby reducing the cutting resistance. Consequently, the chatter vibration of the second cutting edges 62 can be reduced to improve the machining accuracy.

As shown in FIG. 3, the upper surface 2 further includes a pair of protruded parts 23 and 23 respectively located between the first concave groove 21 and each of the pair of second concave grooves 22 and 22. The pair of protruded parts 23 and 23 extend along the longitudinal direction. This configuration allows the generated chips to be easily drawn into the first concave groove 21 by a difference in height that occurs on the upper surface 2, thereby facilitating the compression of the chips in the width direction thereof in the grooving process. In the shoulder grooving process, because the protruded parts 23 are located so as to separate the first concave groove 21 and the second concave grooves 22 from each other, the chips generated by the second cutting edges 62 can be more surely drawn into the second concave groove 22, thus making it easier to maintain the chip discharge direction at the fixed direction. Additionally, in the traversing process, the protruded parts 23 function as a breaker wall, and the curling diameter of the chips generated by the side surface cutting edges 63 can be satisfactorily controlled to suitably divide and discharge the chips. It is noted that the protruded parts 23 correspond to ridge parts.

In the present embodiment, as shown in FIGS. 2 and 3, each of the pair of protruded parts 23 and 23 is continuous with the end surface cutting edge 60, and the distance between the pair of the protruded parts 23 and 23 is increased as separating from the end surface cutting edge 60.

To be specific, FIG. 4(*a*) shows a cross section at a position separated by a distance D1 from the end surface cutting edge 60 in FIG. 3. FIG. 4(*b*) shows a cross section at a position separated by a distance D2 from the end surface cutting edge 60 in FIG. 3. FIG. 4(*c*) shows a cross section at a position separated by a distance D3 from the end surface cutting edge 60 in FIG. 3. A distance between top portions 230 and 230 of the pair of protruded parts 23 and 23 shown in FIG. 4(*a*) is indicated by W1, that in FIG. 4(*b*) is indicated by W2, and that in FIG. 4(*c*) is indicated by W3. As seen from FIGS. 3 and 4, a relationship of D1<D2<D3 and a relationship of W1<W2<W3 are established.

The pair of protruded parts 23 and 23 are respectively continuous with the first cutting edge 61. According to this configuration, in the grooving process, the chips generated by the first cutting edge 61 and the second cutting edges 62 are supported from a bit, thereby facilitating a more stable discharge. In the shoulder grooving process, the entire width of the second cutting edges 62 is usable for cutting because the protruded parts 23 are not continuous with the second cutting edges 62.

Further, the distance between the pair of protruded parts 23 and 23 is increased as separating from the end surface cutting edge 60, so that the protrudes parts 23 extend in a direction to intersect with the second cutting edges 62. Therefore, in the shoulder grooving process, the protruded parts 23 function as a breaker wall against the chips generated by the second cutting edges 62. Consequently, the curling diameter of the chips generated by the second cutting edges 62 can be satisfactorily controlled to improve the chip discharge performance.

In the present embodiment, as shown in FIG. 5(*b*), the top portion 230 of each of the pair of protruded parts 23 and 23 is inclined so as to become closer to the lower surface 3 as separating from the end surface cutting edge 60 in a side view. This configuration makes it easier for the first cutting edge 61 to cut into the workpiece, thereby reducing the cutting resistance. Consequently, the chatter vibration of the first cutting edge 61 and the second cutting edges 62 can be reduced to improve the machining accuracy.

In the present embodiment, as shown in FIG. 5(*b*), the top portion 230 of each of the pair of protruded parts 23 and 23 is located at a lower position than an end portion 62*a* of each of the pair of second cutting edges 62 and 62 which is located closer to the pair of side surfaces 5 and 5 in the side view. According to this configuration, moderate stable helical-shaped chips can be formed by the protruded parts 23 located at the lower position than the end portion 62*a*, particularly when the chips are helically curled and discharged without curling the chips in a spring shape and dividedly discharging them, as in the case of the face grooving process. In the grooving process, the cutting resistance can be reduced to permit satisfactory cutting even under a higher feed rate cutting condition. In the grooving process, the first cutting edge 61 and the second cutting edges 62 are easily subjected to cooling liquid, thereby preventing the first cutting edge 61 and the second cutting edges 62 from becoming hot.

As shown in FIGS. 5(*a*) to 5(*c*), $\alpha 1$, $\beta 1$ and $\gamma 1$ have a relationship of $\alpha 1 < \beta 1 < \gamma 1$, where $\alpha 1$ is an angle formed by at least one of the top portions 230 of the pair of protruded parts 23 and 23 and a reference plane H, $\beta 1$ is an angle formed by at least one of the pair of side surface cutting edges 63 and 63 and the reference plane H, and $\gamma 1$ is an angle formed by the first concave groove 21 and the reference plane H in a side view or a sectional view parallel to the foregoing longitudinal direction.

Specifically, as used herein, the phrase "reference plane H" denotes a plane perpendicular to a central axis S of the insert 1. The reference plane H passes through the end surface cutting edge 60. The phrase "central axis 51 of the insert 1" is the axis extending between the upper surface 2 and the lower surface 3 as shown in FIG. 1, and denotes the axis serving as a rotation axis when the insert 1 is rotated so that the positions of the cutting sections I and I are replaced with each other. The present embodiment satisfies a relationship of $\alpha 1 < \beta 1 < \gamma 1$, where $\alpha 1$ is an angle formed by a virtual extension line K1 of the end portion of the top portion 230 of the protruded parts 23 which is connected to the first cutting edge 61 and the reference plane H as shown in FIG. 5(*a*), $\beta 1$ is an angle formed by a virtual extension line K2 of the side surface cutting edged 63 and the reference plane H in a sectional view as shown in FIG. 5(*b*), and $\gamma 1$ is an angle formed by a virtual extension line K3 of the end portion of the first concave groove 21 which is connected to the first cutting edge 61 and the reference plane H in the sectional view parallel to the foregoing 4 longitudinal direction as shown in FIG. 5(c).

The relationship of α1<β1 ensures that the top portions 230 of the protruded parts 23 are higher than the side surface cutting edges 63 in a side view. Therefore, the chips generated by the side surface cutting edges 63 can be more surely curled and divided in the traversing process. The relationship of β1<γ1 ensures that the thickness of the middle part of the chips generated by the first cutting edge 61 is smaller than the thickness of the end part thereof, thereby facilitating the compression of the chips in the width direction in the grooving process. That is, the relationship of α<β1<γ1 ensures excellent chip discharge performance both in the grooving process and the traversing process. In the present embodiment, for example, α1=2°, β1=4°, and γ1=20° are preferable. It is noted that α1, β1 and γ1 are not limited thereto and can be changed suitably to produce an operation advantage.

In the present embodiment, as shown in FIG. 3, a rear end portion 234 of each of the pair of protruded parts 23 and 23 which is located further away from the end surface cutting edge 60 is continuous with a curvedly protruded part 24 that is curved so as to protrude toward a side separated from the end surface cutting edge 60 in a top view. This configuration prevents the chips generated by the first cutting edge 61 and the second cutting edges 62 from entering the clamp surface 7 of the clamp section II.

As shown in FIGS. 2 and 3, the upper surface 2 further includes an inclined surface 25 that is continuous with the clamp surface 7 and is inclined so as to become closer to the lower surface 3 as becoming closer to the first cutting edge 61 and the second cutting edges 62. This configuration facilitates the helical curling of the chips generated by the first cutting edge 61 and the second cutting edges 62.

In the present invention, as shown in FIG. 5(b), a rear side 24a of the curvedly protruded part 24 which is located further away from the end surface cutting edge 60 is located on the inclined surface 25 in a side view. That is, the rear side 24a of the curvedly protruded part 24 is located at a higher position than a front end side 24b. This configuration prevents the chips generated by the first cutting edge 61 and the second cutting edges 62 from entering the clamp surface 7.

As shown in FIGS. 2 and 3, pair of first auxiliary protruded parts 26 and 26 are respectively disposed on both sides of the curvedly protruded part 24. In the present embodiment, as shown in FIG. 3, the pair of first auxiliary protruded parts 26 and 26 are respectively located on a perpendicular bisector L62 of a line segment W62 equal to the width of both end portions of the second cutting edges 62 in a top view.

Next, inserts according to other embodiments of the present invention are described in detail, taking for example first to fifth embodiments with reference to FIGS. 6 to 19. Configurations similar to those of the insert according to the foregoing embodiment are omitted for convenience' sake. In FIGS. 6 to 19, elements similar to those in FIGS. 1 to 5 are identified by the same reference numerals, and descriptions thereof are omitted here.

First Embodiment

The first embodiment of the insert according to the present embodiment is described in details with reference to FIGS. 6 to 10.

Figure 6A:
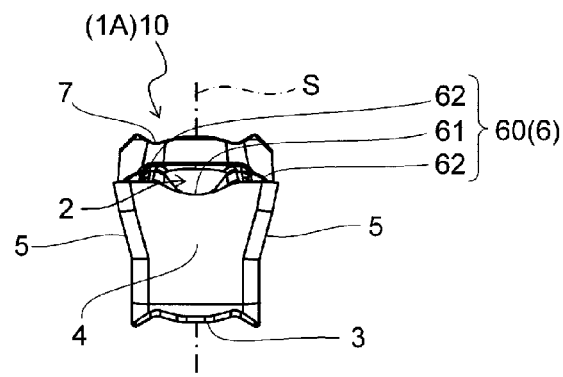
FIG. 6(a) is a front view (end surface view) showing a cutting insert according to a first embodiment of a cutting insert of other embodiment of the present invention.
Figure 6B:
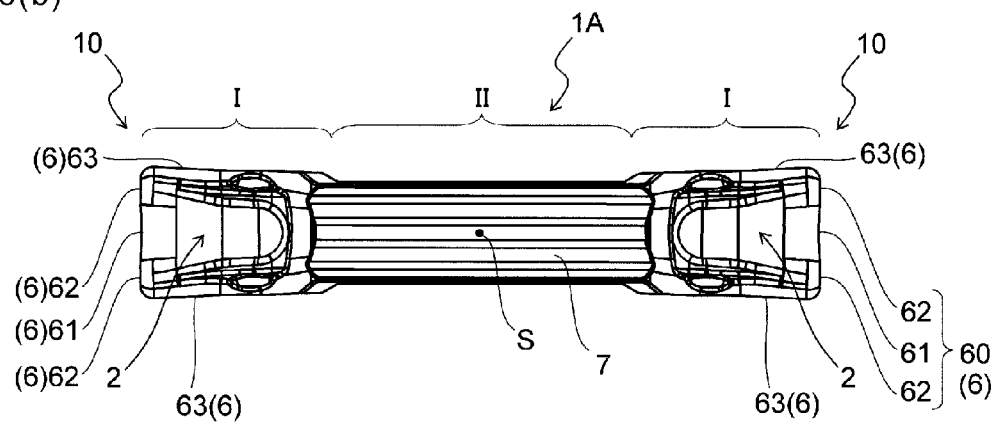
FIG. 6(b) is a plan view (top view) thereof.

As shown in FIG. 6, the insert 1A of the present embodiment has a prism-like shape and includes cutting sections I and I (bodies 10 and 10) located at both ends thereof and a clamp section II located between the cutting sections I and I.

The body 10 (cutting section I) includes an upper surface 2, a lower surface 3, an end surface 4 that is connected to each of the upper surface 2 and the lower surface 3 and is located closer to a front end in the longitudinal direction of the body 10, and a pair of side surfaces 5 and 5 respectively located on both sides in the longitudinal direction of the body 10. The height from the lower surface 3 to the upper surface 2 of the insert 1A is preferably, for example, 3.4 to 4.6 mm.

Figure 7:
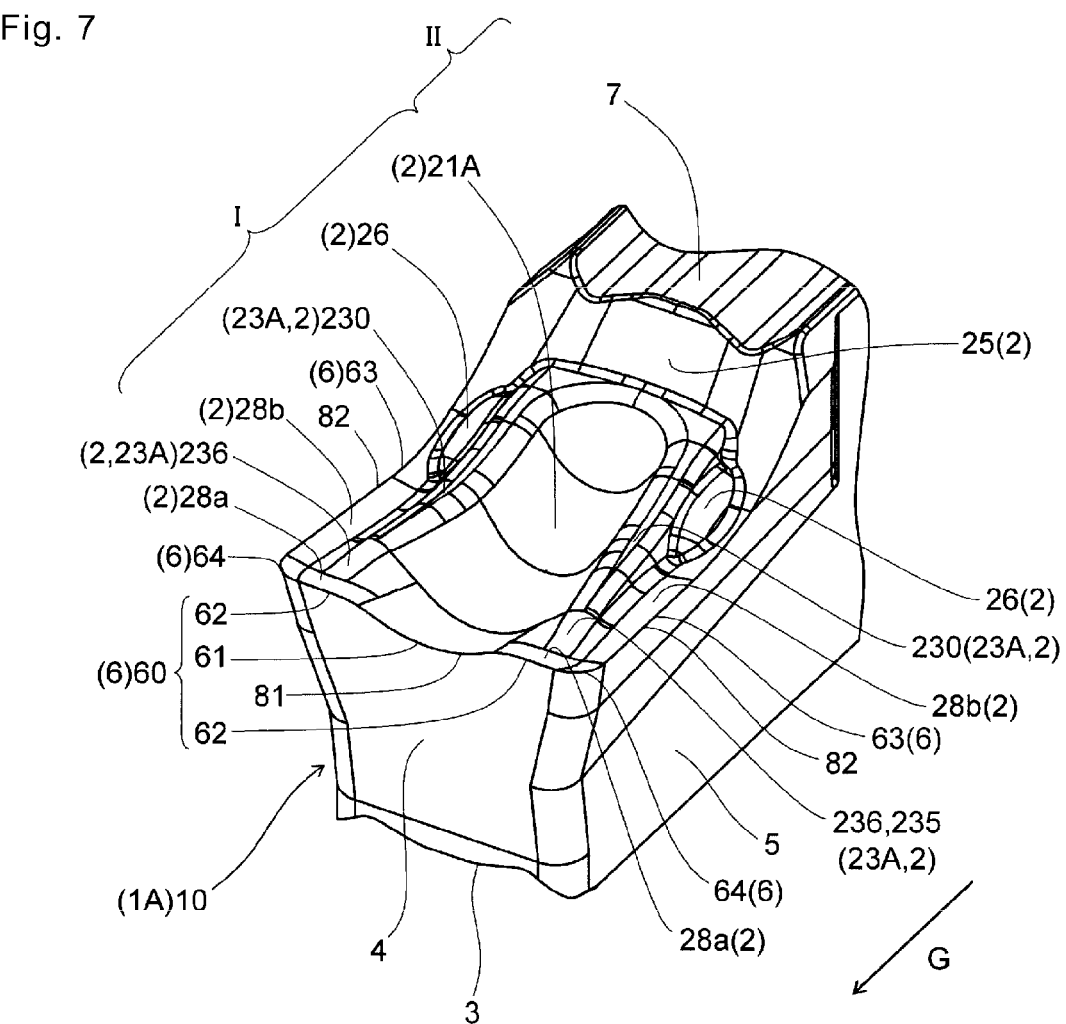
FIG. 7 is a partially enlarged perspective view of the cutting insert shown in FIG. 6.

As shown in FIG. 7, the body 10 further includes a cutting edge 6 located at a first intersecting line 81 of the upper surface 2 and the end surface 4. In the present embodiment, the cutting edge 6 includes an end surface cutting edge 60 having a concave-shaped first cutting edge 61. This configuration facilitates the deformation of the chips generated by the cutting edge 6 in the width direction and thus prevents damage to a machined surface in the grooving process.

In the present embodiment, from the viewpoint of reasonably facilitating the deformation of the chips in the width direction, as shown in FIG. 6(a), the first cutting edge 61 preferably has a curved line shape protruding toward the lower surface 3 and an arc-like shape in the end surface view.

Figure 8:
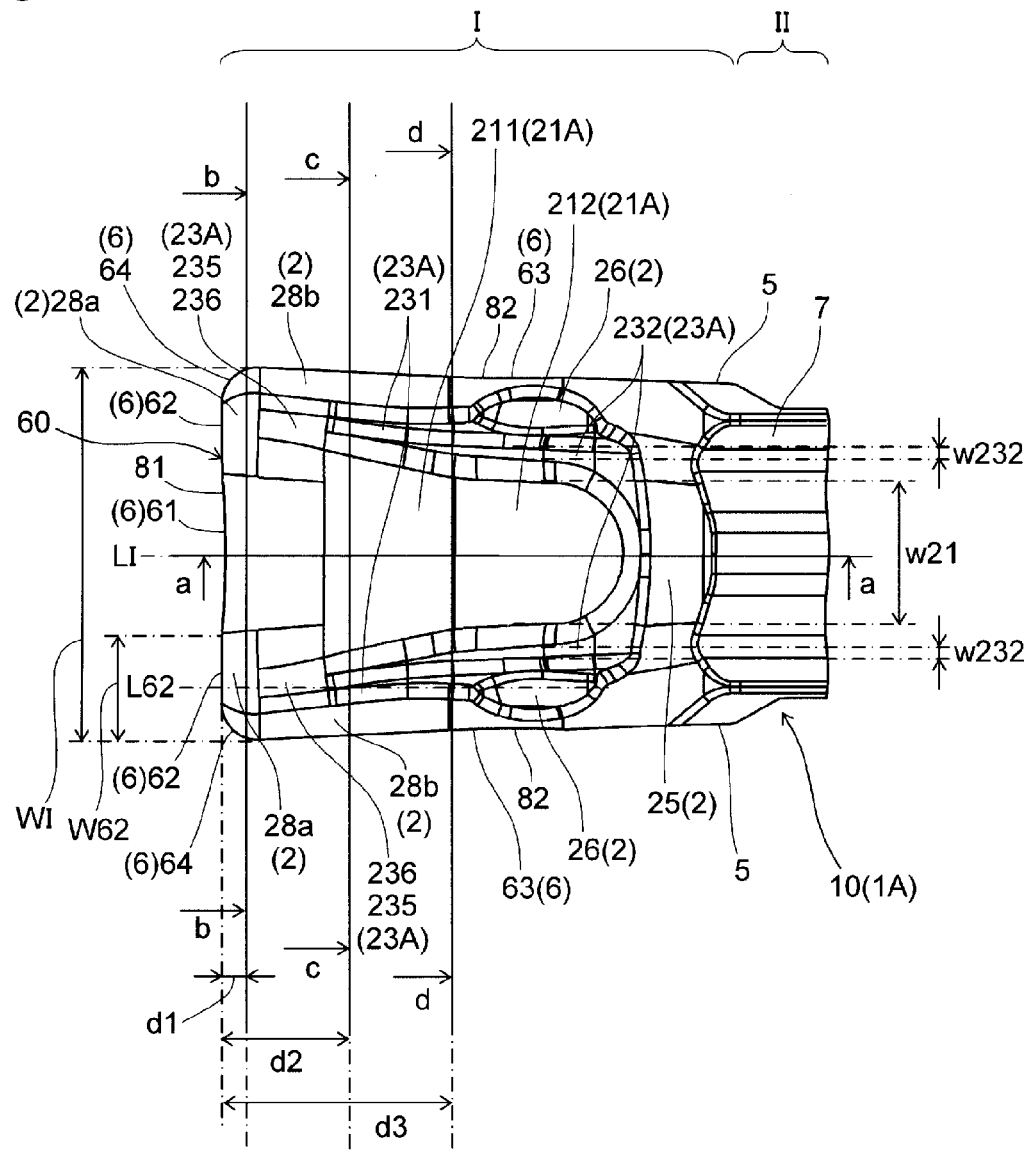
FIG. 8 is a partially enlarged view of the cutting insert shown in FIG. 6(b)

An end surface cutting edge 60 includes a pair of second cutting edges 62 and 62 located on both sides of the first cutting edge 61, as shown in FIGS. 7 and 8. This configuration allows the insert 1A to be used in the shoulder grooving process for enlarging the width of the machined groove by using the second cutting edges 62. In the present embodiment, the second cutting edges 62 have a straight line shape in the end surface view as shown in FIG. 6(a).

In the present embodiment, as shown in FIGS. 7 and 8, the cutting edge 6 further includes a pair of side surface cutting edges 63 and 63 located on a pair of second intersecting lines 82 and 82 which are respectively the intersecting lines of the upper surface 2 and a pair of side surfaces 5 and 5. This configuration allows the insert 1A to be used in the traversing process for cutting the workpiece by using the side surface cutting edges 63.

Figure 6C:
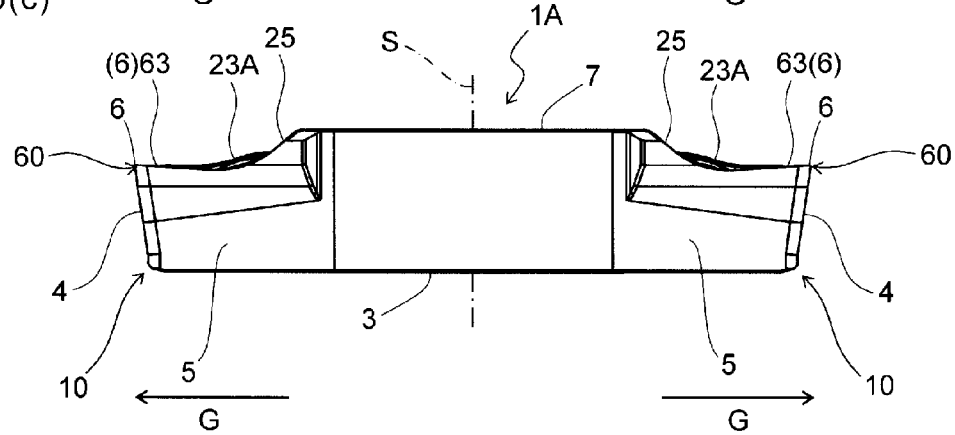
FIG. 6(c) is a side view thereof.

In the present embodiment, as shown in FIG. 6(c), the pair of side surface cutting edges 63 and 63 are inclined so as to become closer to the lower surface 3 as separating from the end surface cutting edge 60 in a side view. This configuration reduces the cutting resistance in the side surface cutting edges 63.

In the present embodiment, as shown in FIG. 8, the corner cutting edges 64 having an arc-like shape protruding outward of the body 10 in a top view are disposed at intersections of the second cutting edges 62 and the side surface cutting edges 63. This configuration reduces a fracture at the intersections of the second cutting edges 62 and the side surface cutting edges 63.

A region of the upper surface 2, which is continuous with the second cutting edges 62 and the side surface cutting edges 63, satisfactorily functions particularly as a rake surface 28.

In the present embodiment, the upper surface 2 further includes a pair of rake surfaces 28a and 28a which are respectively continuous with the second cutting edges 62 and 62 and extend along the longitudinal direction of the body 10. In the present embodiment, as shown in FIG. 9(a), the rake surfaces 28a are inclined so as to become closer to the lower surface 3 as separating from the second cutting edges 62. This configuration makes it easier for the second cutting edges 62 to cut into the workpiece, thereby reducing the cutting resistance. Consequently, the chatter vibration of the second cutting edges 62 can be reduced to improve the machining accuracy. This configuration also facilitates the curling of chips generated by the second cutting edges 62 in the shoulder grooving process using the second cutting edges 62.

In the present embodiment, the upper surface 2 still further includes a pair of rake surfaces 28b and 28b which are respectively continuous with the pair of side surface cutting edges 63 and 63 and extend along the longitudinal direction of the body 10. In the present embodiment, as shown in FIG. 10, the rake surfaces 28b are inclined so as to become closer to the lower surface 3 as separating from the side surface cutting edges 63. This configuration makes it easier for the side surface cutting edges 63 to cut into the workpiece, thereby reducing the cutting resistance. Consequently, the chatter vibration of the side surface cutting edges 63 can be reduced to improve the machining accuracy. This configuration also facilitates the curling of chips generated by the side surface cutting edges 63 in the traversing process using the side surface cutting edges 63.

As shown in FIG. 8, the upper surface 2 further includes a first concave groove 21A which is continuous with the cutting edge 6 (first cutting edge 61) and extends along the longitudinal direction of the body 10, and a pair of protruded parts 23A and 23A which are respectively located at both sides of the first concave groove 21A and extend along the longitudinal direction of the body 10.

In the present embodiment, as shown in FIG. 9(a), a top portion 230 of each of the pair of protruded parts 23A and 23A includes a descending top portion 231 inclined so as to become closer to the lower surface 3 as separating from the end surface cutting edge 60 in a sectional view on ridge lines of the protruded parts 23A. This configuration makes it easier for the chips generated by the end surface cutting edge 60 to be guided to the first concave groove 21A by the descending top portions 231 inclined so as to become closer to the lower surface 3.

As shown in FIG. 8, the first concave groove 21A includes a first region 211 that is located between the pair of descending top portions 231 and 231 and has a larger depth as separating from the end surface cutting edge 60 in a top view. This configuration further facilitates the compression of the chips in the width direction thereof, and further reduces the curling diameter of the chips. Consequently, the chip discharge direction is easily stabilized to improve the chip discharge performance.

In the present embodiment, the descending top portions 231 of the pair of protruded parts 23A and 23A are located at a lower position than the highest portion of the cutting edge 6. Specifically, as shown in FIG. 9(a), a plane T1 of the reference plane H passing through the highest position of the descending top portion 231 is lower than the highest portion of the cutting edge 6. In the present embodiment, the reference plane H is parallel to a flat surface h with which the lower surface 3 is stably contacted when the body 10 is mounted thereon. As used herein, the phrase "is stably contacted" denotes that the lower surface 3 and the flat surface h are contacted with each other at least three points. This configuration allows the chips to be more surely drawn into the first concave groove 21A and thus generates helical shaped chips with a stable curling diameter by the descending top portions 231 at the lower position than the cutting edge 6, particularly when the chips are helically curled and discharged without curling the chips in the spring shape and dividedly discharging them, as in the case of the face grooving process. In the grooving process, this configuration reduces the cutting resistance, and hence the damage to the cutting edge 6 can be reduced even under a high load cutting condition. In the grooving process, this configuration prevents the chips generated by the cutting edge 6 from staying in the machined groove. As a result, cooling liquid can be more surely supplied to the cutting edge 6, thereby producing an effect of preventing the cutting edge 6 from becoming hot.

Figure 10A:
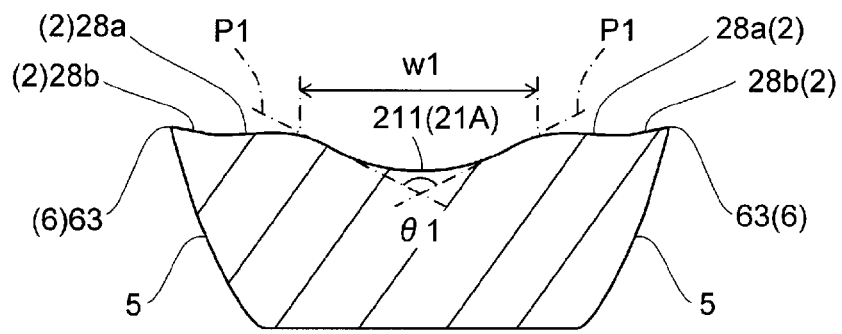
FIG. 10(a) is a sectional view taken along line b-b in the cutting insert shown in FIG. 8.
Figure 10B:
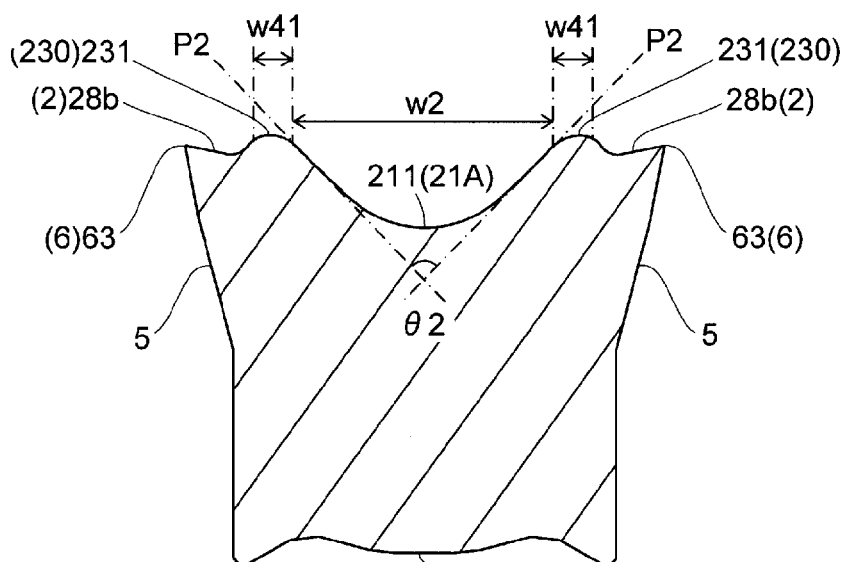
FIG. 10(b) is a sectional view taken along line c-c therein.
Figure 10C:
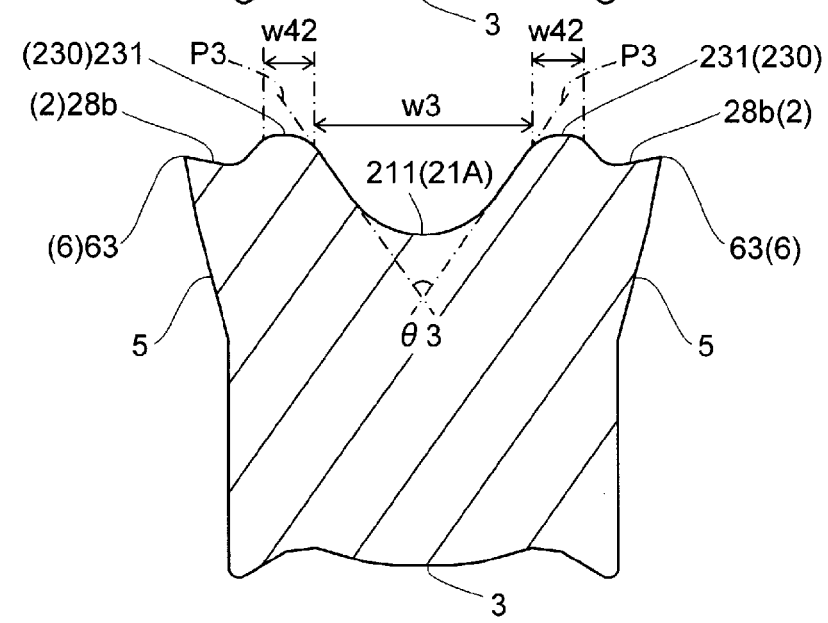
FIG. 10(c) is a sectional view taken along line d-d therein.

The width of the first concave groove 21A in a region located between the first cutting edge 61 and the first region 211 is increased as separating from the first cutting edge 61 in a top view. As used herein, the phrase "width of the first concave 21A" denotes a distance between end portions of opposite inner wall surfaces of the first concave grooves 21A in the width direction of the body 10 in the top view. For example, when distances d1, d2 and d3 from the end surface cutting edge 60 have a relationship of d1<d2<d3 in FIG. 8, cross sections on a plane perpendicular to the lower surface 3 at individual positions, namely, the cross sections parallel to the central axis S are shown in FIG. 10. Specifically, FIG. 10(a) shows the cross section at the position separated by the distance d1 from the first cutting edge 61. FIG. 10(b) shows the cross section at the position separated by the distance d2 from the first cutting edge 61. FIG. 10(c) shows the cross section at the position separated by the distance d3 from the first cutting edge 61. The distance between the inner wall surfaces of the first concave groove 21A shown in FIG. 10(a) is indicated by w1 that in FIG. 10(b) is indicated by w2, and that in FIG. 10(c) is indicated by w3. Accordingly, a relationship of d1<d2 and a relationship of w1<w2 are established. This configuration ensures retention of the strength of the insert 1A in the vicinity of the cutting edge 6 which is susceptible to a large cutting load.

The width of the first concave groove 21A in the first region 211 is decreased as separating from the first cutting edge 61 in a top view. As shown in FIGS. 4 and 5, a relationship of d2<d3 and a relationship of w2>w3 are established. According to this configuration, the width of the first region 211 is decreased with increasing the depth thereof, thereby facilitating the compression of the chips generated by the cutting edge 6 in the width direction of the chips.

An angle formed by straight lines respectively passing through both end portions of a pair of inner wall surfaces of the first concave groove 21A is decreased as separating from the first cutting edge 61 in a sectional view on a plane parallel to the first cutting edge 61 and perpendicular to the lower surface 3, namely, in a sectional view perpendicular to the foregoing longitudinal direction.

To be specific, in FIG. 10(a), θ1 indicates an angle formed by straight lines P1 and P1 passing through both end portions of the inner wall surfaces of the first concave groove 21A. In FIG. 10(b), θ2 indicates an angle formed by straight lines P2 and P2 passing through both end portions of the inner wall surfaces in the first region 211 of the first concave groove 21A. In FIG. 10(c), θ3 indicates an angle formed by straight lines P3 and P3 passing through both end portions of the inner wall surfaces in the first region 211 of the first concave groove 21A. Hereat, there is a relationship of θ1>θ2>θ3. Accordingly, a relationship of d1<d2<d3 and a relationship of θ1>θ2>θ3 are established. According to this configuration, the chips generated by the cutting edge 6 are subjected to a force exerted from the inner wall surface of the chips in a compression direction, thereby more satisfactorily facilitating the compression of the chips in the width direction thereof.

In the present embodiment, in order to more surely improve the chip discharge performance, particularly in the first region 211, the angle formed by the straight lines passing through both end portions of the pair of inner wall surfaces of the first concave groove 21A is decreased as separating from the first cutting edge 61.

Further in the present embodiment, the distance between the pair of protruded parts 23A and 23A is decreased as separating from the end surface cutting edge 60, as shown in FIG. 8. This configuration further facilitates the compression of the chips generated by the end surface cutting edge 60 in the width direction of the chips.

In the present embodiment, as shown in FIG. 8, the width of each of the pair of descending top portions 231 and 231 is increased as separating from the end surface cutting edge 60 in a top view. Specifically, the widths of the pair of descending top portions 231 and 231 as shown in FIG. 10(b) are respectively indicated by w41 and w41. The widths of the pair of descending top portions 231 and 231 as shown in FIG. 10(c) are respectively indicated by w42 and w42. Hereat, there are a relationship of d1<d2<d3 and a relationship of w41<w42. According to this configuration, a chip grazing speed can be satisfactorily controlled in such a way that a contact area between both end portions in the width direction of the chips generated by the end surface cutting edge 60 and the descending top portions 231 and 231 is gradually increased as separating from the end surface cutting edge 60.

In the present embodiment, as shown in FIG. 9(a), a top portion 230 of each of the pair of protruded parts 23A and 23A includes an ascending top portion 232 which is continuous with an end portion 231a of the descending top portion 231 located further away from the end surface cutting edge 60, and is inclined so as to be separated from the lower surface 3 as separating from the end surface cutting edge 60. When the chips generated by the end surface cutting edge 60 graze the ascending top portions 232, a front part of the chips is located higher than a rear part thereof, and a travel speed of the front part is lower than that of the rear part. Therefore, the front part of the chips travels by its own weight along the ascending top portions 232 in the opposite direction to a chip travel direction, resulting in a smaller curling diameter of the chips. As a result, the chip discharge direction is stabilized and the chip discharge performance is further improved.

In the present embodiment, as shown in FIG. 8, the first concave groove 21A further includes a second region 212 which is continuous with the first region 211 and located between the pair of ascending top portions 232 and 232, and has a smaller depth as separating from the end surface cutting edge 60 in a top view. According to this configuration, the depth of the second region 212 of the first concave groove 21A is decreased with increasing the height of the pair of ascending top portions 232 and 232. It is therefore capable of facilitating the curling of the chips generated by the end surface cutting edge 60 while supporting the bottom of the chips.

In the present embodiment, as shown in FIG. 8, a width w21 of the first concave groove 21A in the second region 212 is held substantially constant in a top view. According to this configuration, the chip travel direction can be stabilized in a fixed direction by applying no excessive load thereto in order to maintain the force exerted on the chips generated by the end surface cutting edge 60. As used herein, the phrase "substantially constant" denotes that an amount of change per unit of the width is ±5% or less.

In the present embodiment, as shown in FIG. 8, widths w232 and w232 of the pair of ascending top portions 232 and 232 are substantially constant in the top view. This configuration prevents the chips generated by the end surface cutting edge 60 from traveling while causing the lateral vibration.

In the present embodiment, as shown in FIG. 8, the pair of protruded parts 23A and 23A are respectively located on a perpendicular bisector L62 of each of the pair of second cutting edges 62 and 62 in the top view. According to this configuration, in the shoulder grooving process using the second cutting edges 62, the pair of protruded parts 23A and 23A function as a breaker wall against the chips generated from the second cutting edges 62, thereby facilitating the curling and deformation of the chips generated by the second cutting edges 62. Consequently, the chip discharge performance is also improved in the shoulder grooving process.

In the present embodiment, as shown in FIGS. 7, 8 and 9(a), the pair of protruded parts 23A and 23A are respectively located away from the pair of second cutting edges 62 and 62. A front end part 235 of each of the pair of protruded parts 23A and 23A which is located closer to the end surface cutting edge 60 include a rising surface 236 inclined so as to be separated from the lower surface 3 as separating from the pair of second cutting edges 62 and 62. That is, as shown in FIG. 8, the front end part 235 of each of the pair of protruded parts 23A and 23A is comprised of a surface. This configuration increases a contact area of the chips generated by the second cutting edges 62, thereby achieving a satisfactory control of the curling diameter of the chips in the shoulder grooving process. No limit is imposed on inclination angle, height and area of the rising surface 236, and their respective values need to be suitably set according to a cutting condition.

In the present embodiment, as shown in FIG. 8, the pair of rising surfaces 236 and 236 are located in a direction to intersect with the second cutting edges 62, and are formed so that a distance therebetween is decreased as separating from the end surface cutting edge 60 in a top view. According to this configuration, in the grooving process using the end surface cutting edge 60, the chips generated by the end surface cutting edge 60 can be more easily drawn into the first concave groove 21A while being compressed between the pair of rising surfaces 236 and 236 in the width direction of the chips.

The present embodiment satisfies a relationship of $\alpha 2 < \beta 2 < \gamma 2$, where $\alpha 2$ is an angle formed by at least one of the pair of descending top portions 231 and 231 and the reference plane H, $\beta 2$ is an angle formed by at least one of the pair of side surface cutting edges 63 and 63 and the reference plane H, and $\gamma 2$ is an angle formed by the first concave groove 21A and the reference plane H in a side view or a sectional view parallel to the foregoing longitudinal direction.

To be specific, as shown in FIG. 9(a), there is a relationship of $\alpha 2 < \beta 2 < \gamma 2$, where $\alpha 2$ is an angle formed by a virtual extension line k1 of an end portion of the descending top portion 231 located closer to the end surface cutting edge 60 and the reference plane H as shown in FIG. 9(a), $\beta 2$ is an angle formed by a virtual extension line k2 of the side surface cutting edge 63 and the reference plane H as shown in FIG. 9(b), and $\gamma 2$ is an angle formed by a virtual extension line 3 of an end portion of the first concave groove 21A located on the side being continuous with the first cutting edge 61 and the reference plane H as shown in FIG. 9(c).

The relationship of $\alpha 2 < \beta 2$ ensures that the top portion 230 of the protruded part 23A is higher than the side surface cutting edge 63 in a side view. Therefore, in the traversing process, the chips generated by the side surface cutting edges 63 can be more surely curled and divided. The relationship of $\beta 2 < \gamma 2$ ensures that the thickness of a middle part of chips generated by the first cutting edge 61 is smaller than the thickness of an end part thereof, thereby facilitating the compression of the chips in the width direction in the grooving process. That is, the relationship of $\alpha 2 < \beta 2 < \gamma 2$ improves the chip discharge performance both in the grooving process and traversing process. In the present embodiment, for example, $\alpha 2 = 2°$, $\beta 2 = 4°$, and $\gamma 2 = 20°$ are preferable. It is noted that $\alpha 2$, $\beta 2$ and $\gamma 2$ are not limited thereto and can be changed suitably to produce an operation advantage.

The upper surface 2 further includes an inclined surface 25 that is continuous with the clamp surface 7 and is inclined so as to become closer to the lower surface 3 as becoming closer to the end surface cutting edge 60, as shown in FIGS. 7 and 8.

In the present embodiment, as shown in FIG. 6(c), a read side of the protruded part 23A located further away from the end surface cutting edge 60 is located on the inclined surface 25 in a side view. That is, the rear side of the protruded part 23A is located at a higher position than a front end side thereof. This configuration prevents the chips generated by the end surface cutting edge 60 from entering the clamp surface 7.

As shown in FIGS. 7 and 8, pair of first auxiliary protruded parts 26 and 26 are respectively disposed on both sides of the pair of protruded parts 23A and 23A. This configuration ensures a still larger thickness in the vicinity of a lower end portion of each of the pair of protruded parts 23A and 23A, thereby reducing a fracture of the pair of protruded parts 23A and 23A even under a high load cutting condition under which the chips strike vigorously. Also in the present embodiment, the thickness is ensured by forming the pair of first auxiliary protruded parts 26 and 26. Therefore, the contact area with the chips is reduced, thereby reducing cutting resistance in the grooving process. In the shoulder grooving process, it is capable of ensuring space for discharging the chips generated by the second cutting edges 62. As another example of ensuring the thickness in the vicinity of the lower end portion of each of the pair of protruded parts 23A and 23A, there is a method of disposing walls that respectively reach the side surface cutting edges 63 on both sides of the pair of protruded parts 23A and 23A. In this case, each wall surface is formed so as to hinder the travel direction of the chips generated by the end surface cutting edge 60. Therefore, in the grooving process, the contact area is increased and the cutting resistance is increased. In the shoulder grooving process, the chip discharge performance may be deteriorated due to chip clogging. On the contrary, the present embodiment ensures the space in the vertical and lateral directions than the case of disposing the walls as described above, thereby making it easier to design the insert 1A having excellent chip discharge performance.

Other configurations are similar to those of the insert 1 according to the foregoing embodiment, and hence descriptions thereof are omitted here.

Second Embodiment

Figure 11:
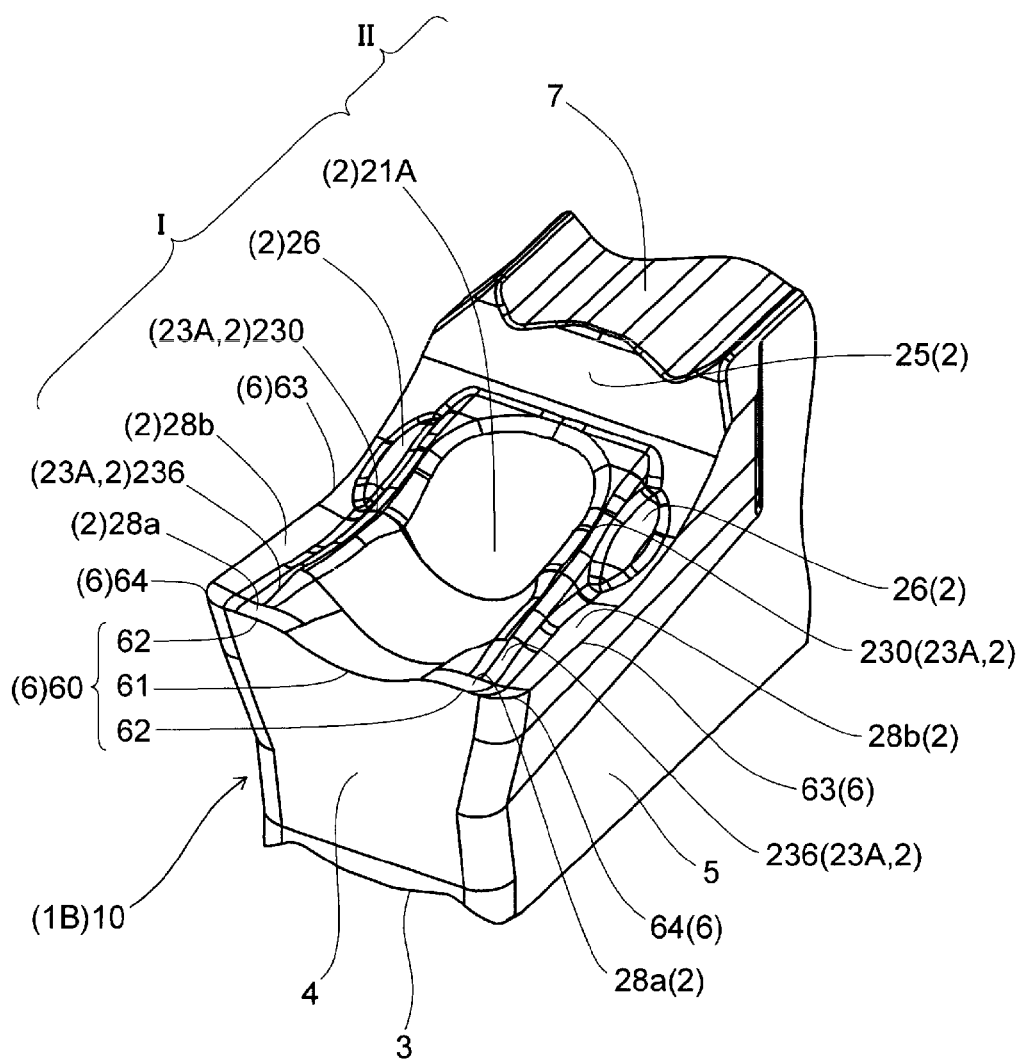
FIG. 11 is a partially enlarged perspective view showing a cutting insert according to a second embodiment of the present invention.
Figure 12:
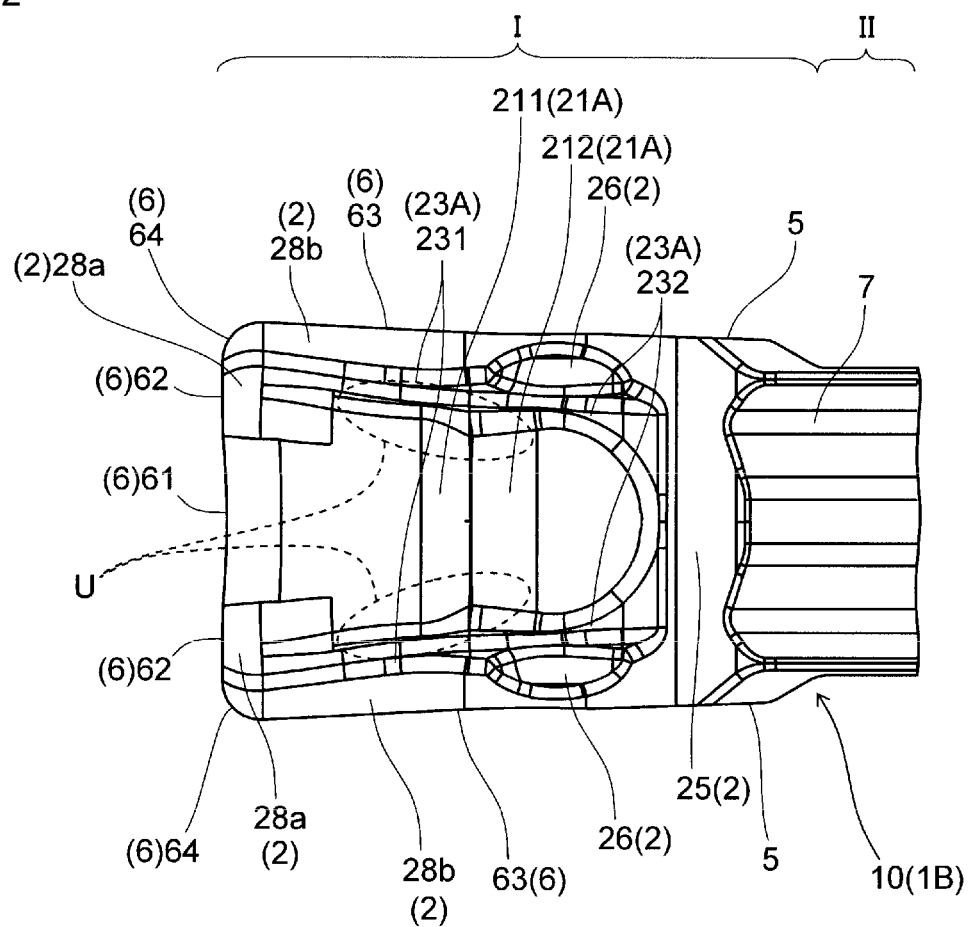
FIG. 12 is a partially enlarged plan view (top view) of the cutting insert shown in FIG. 11.

A second embodiment is described below with reference to FIGS. 11 and 12. Only different elements from those of the insert 1A are described in the following.

In an insert 1B of the present embodiment, an edge of first concave groove 21A on the rear side of a first region 211 is formed so as to protrude outward of a body 10 in a top view. Specifically, in a region U as shown in FIG. 12, the edge of the first concave groove 21A is formed so as to protrude outward of the body 10. This configuration ensures a larger space in the width direction into which the chips generated by an end surface cutting edge 60 fall when the chips are curled by a pair of ascending top portions 232 and 232 and a second region 212. Consequently, the curling diameter of the chips can be more satisfactorily controlled.

In the present embodiment, the first region 211 of the first concave groove 21A has a larger depth than the insert 1A in a sectional view perpendicular to the foregoing longitudinal direction. This configuration ensures a larger space in a vertical direction into which the chips generated by the end surface cutting edge 60 fall when the chips are curled by the pair of ascending top portions 232 and 232 and the second region 212. Consequently, the curling diameter of the chips can be more satisfactorily controlled.

Third Embodiment

Figure 13:
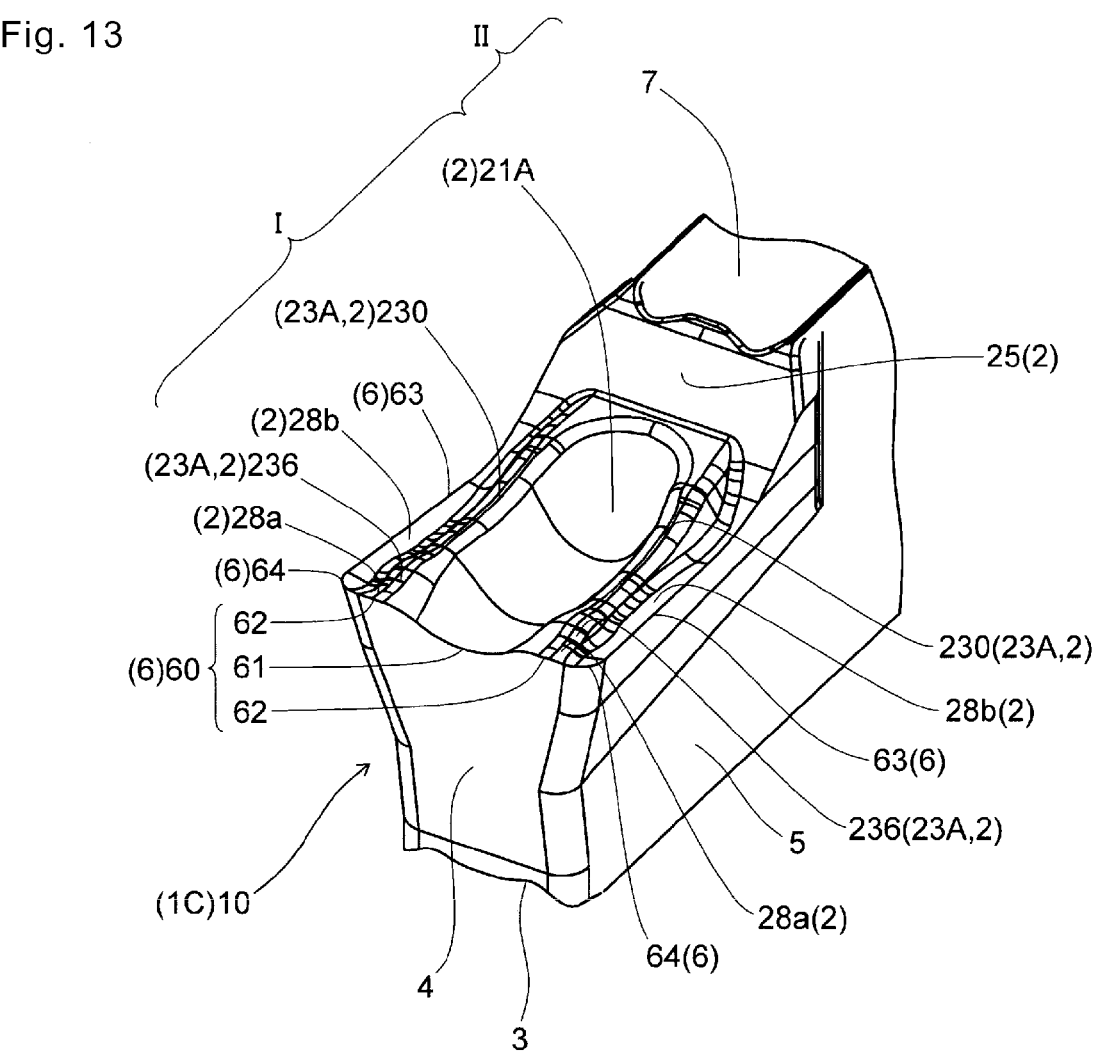
FIG. 13 is a partially enlarged perspective view showing a cutting tool according to a third embodiment of the present invention.
Figure 14:
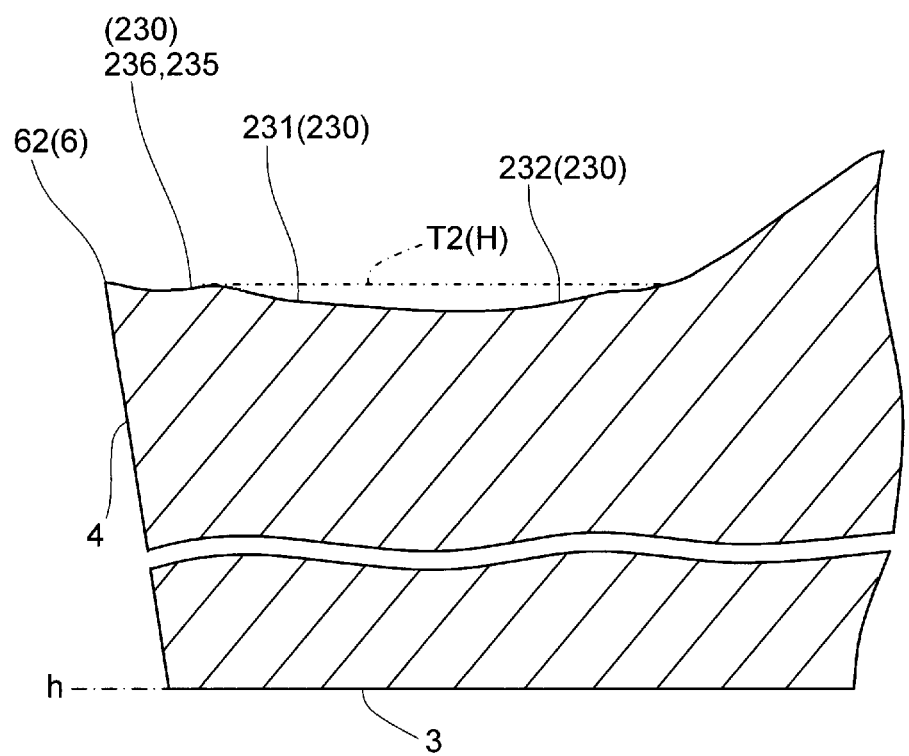
FIG. 14 is a partially enlarged sectional view on a ridgeline of a protruded part of the cutting insert shown in FIG. 13.

A third embodiment is described below with reference to FIGS. 13 to 15. Only different elements from those of the inserts 1A and 1B are described in the following.

In an insert 1C of the present embodiment, a rising surface 236 has a larger height than a descending top portion 231 and an ascending top portion 232. Specifically, a plane T2 of a reference plane H passing through a top portion of the rising surface 236 is located higher than the descending top portion 231 and the ascending top portion 232 as shown in FIG. 14. According to this configuration, in the shoulder grooving process using second cutting edges 62, the curling diameter of chips generated by the second cutting edges 62 can be satisfactorily controlled even under a cutting condition that a high feed rate is applied to a workpiece and a tool.

In the present embodiment, an upper surface 2 does not include a pair of first auxiliary protruded parts 26 and 26 from the viewpoint of simplifying a mold formation and reducing the amount of material used.

Figure 15:
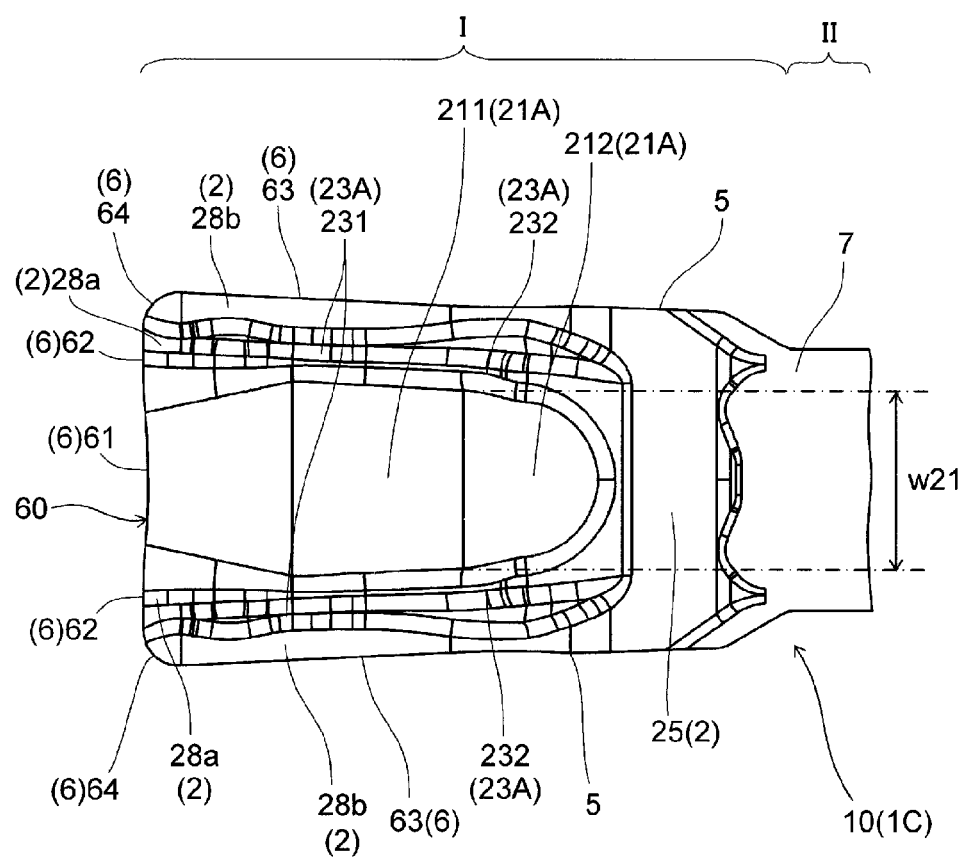
FIG. 15 is a partially enlarged plan view (top view) of the cutting insert shown in FIG. 13.

In the present embodiment, as shown in FIG. 15, a width w21 of a first concave groove 21A in a second region 212 is decreased as separating from an end surface cutting edge 60, and the first region 211 and the second region 212 are smoothly continuous with each other in a top view. According to this configuration, a force that the chips generated by the end surface cutting edge 60 receive from the inner wall surfaces of the first concave groove 21A can be gradually increased, thereby facilitating the compression of the chips without applying a rapid load thereto.

Fourth Embodiment

A fourth embodiment is described below with reference to FIG. 16. Only different elements from those of the inserts 1A, 1B and 1C are described in the following.

Figure 16:
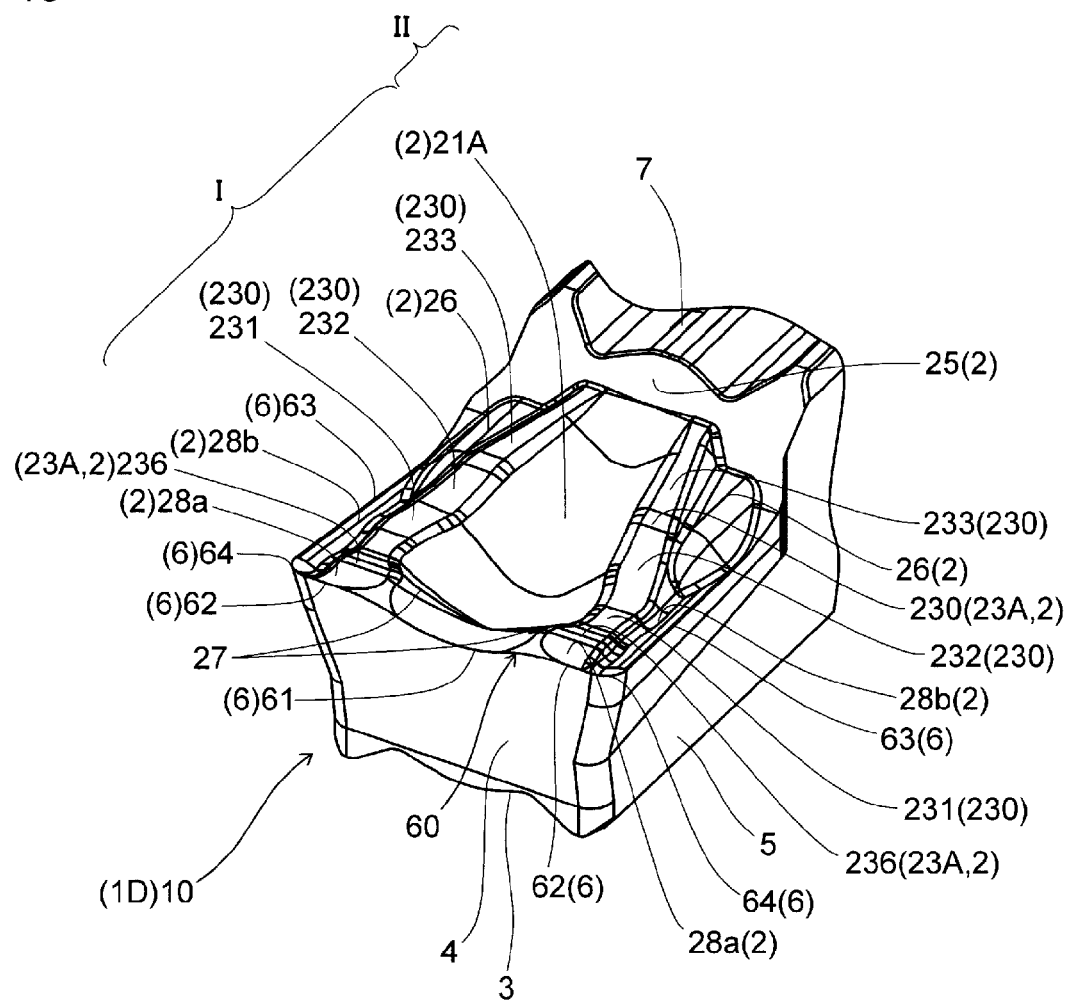
FIG. 16 is a partially enlarged perspective view showing a cutting insert according to a fourth embodiment of the present invention.

In an insert 1D of the present embodiment, as shown in FIG. 16, a bottom part of a first concave groove 21A includes a pair of second auxiliary protruded parts 27 and 27 which are continuous with a pair of rising surfaces 236 and 236 and extend in a direction in which the rising surfaces 236 and 236 are located. According to this configuration, in the shoulder grooving process, the insert 1D is applicable to a cutting process that requires a larger depth of cut than that for a predetermined second cutting edge 62, and the pair of second auxiliary protruded parts 27 and 27 function as a chip breaker wall.

In the present embodiment, as shown in FIG. 16, a top portion 230 of each of a pair of protruded parts 23A and 23A includes an auxiliary ascending top portion 233 which is continuous with an end portion of the ascending top portion 232 located further away from an end surface cutting edge 60, and is inclined further away from a lower surface 3 as separating from the end surface cutting edge 60. According to this configuration, an inclined portion that provides a function to facilitate the curling of chips generated from the end surface cutting edge 60 can be comprised of multiple stages. Therefore, the angle and height of the ascending top portion 232 and the auxiliary ascending top portion 233 can be suitably set depending on a cutting condition, thereby enhancing versatility.

Fifth Embodiment

A fifth embodiment is described below with reference to FIGS. 17 to 19. Only different elements from those of the inserts 1A, 1B, 1C and 1D are described in the following.

Figure 17:
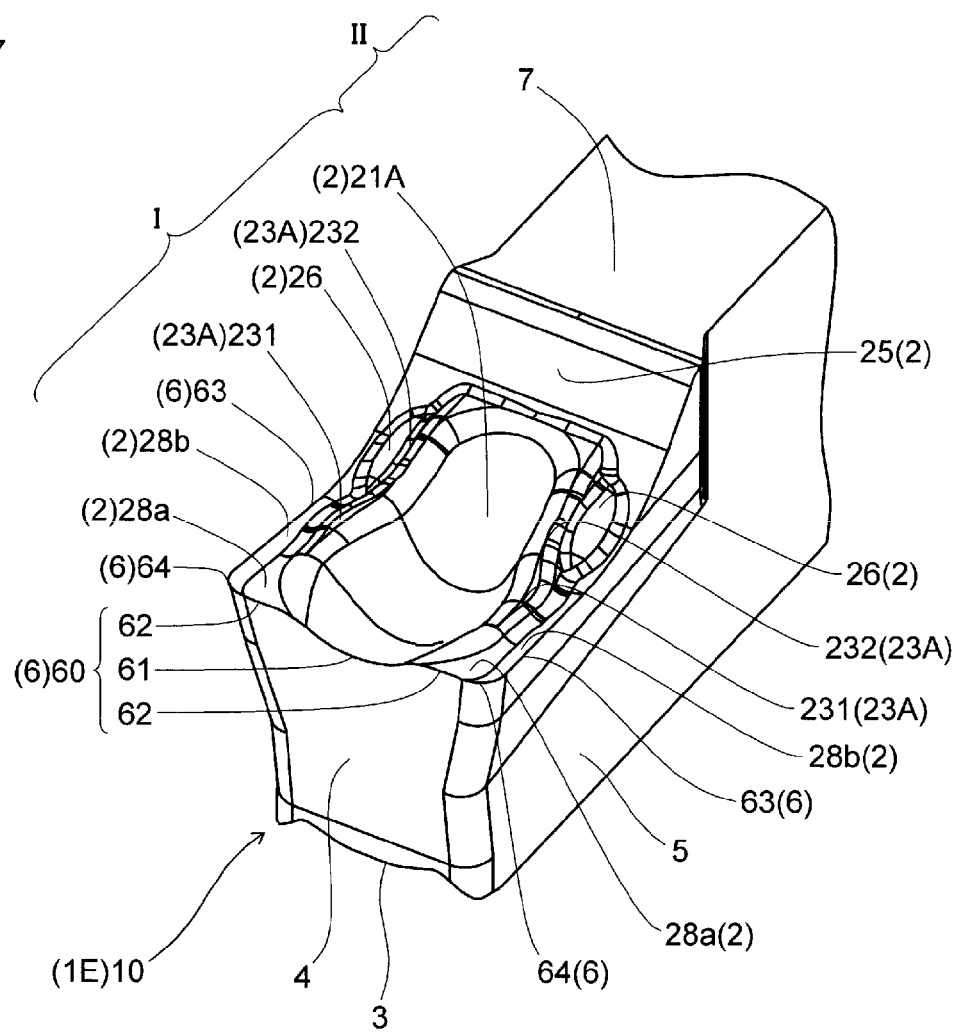
FIG. 17 is a partially enlarged perspective view showing a cutting insert according to a fifth embodiment of the present invention.
Figure 18:
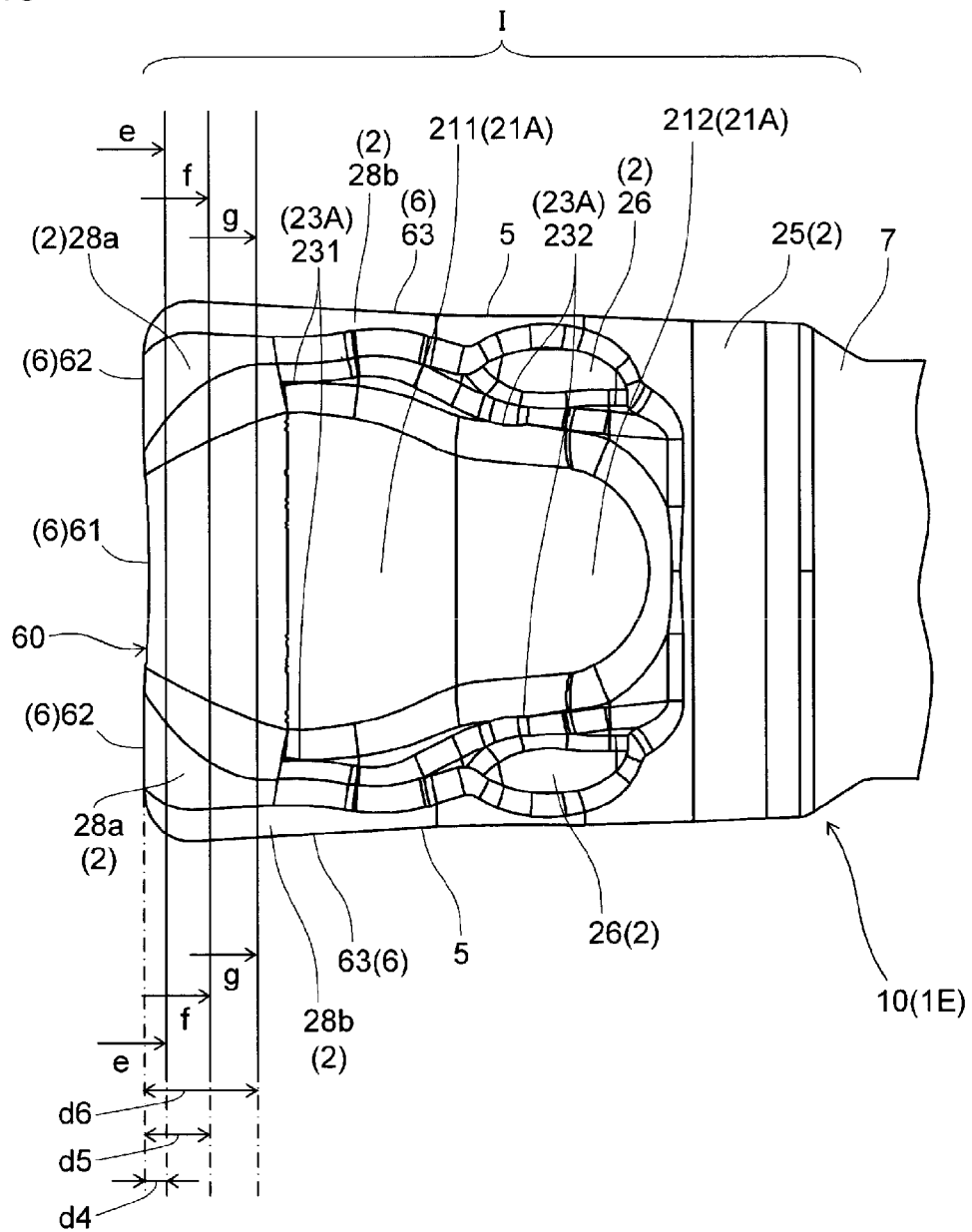
FIG. 18 is a partially enlarged plan view (top view) of the cutting insert shown in FIG. 17.

In an insert 1E of the present embodiment, pair of protruded parts 23A and 23A are respectively continuous with a first cutting edge 61 as shown in FIG. 17. According to this configuration, in the grooving process, the chips generated by the first cutting edge 61 and second cutting edges 62 are supported from a bit, thereby facilitating a more stable discharge. In the shoulder grooving, the entire width of the second cutting edges 62 is usable for cutting because the protruded parts 23A are not continuous with the second cutting edges 62.

Figure 19A:
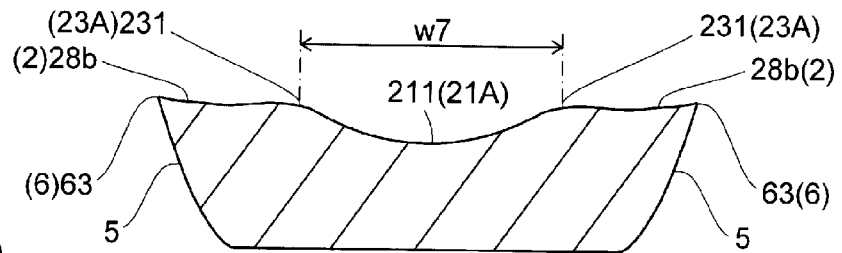
FIG. 19(a) is a sectional view taken along line e-e in the cutting insert shown in FIG. 18.
Figure 19B:
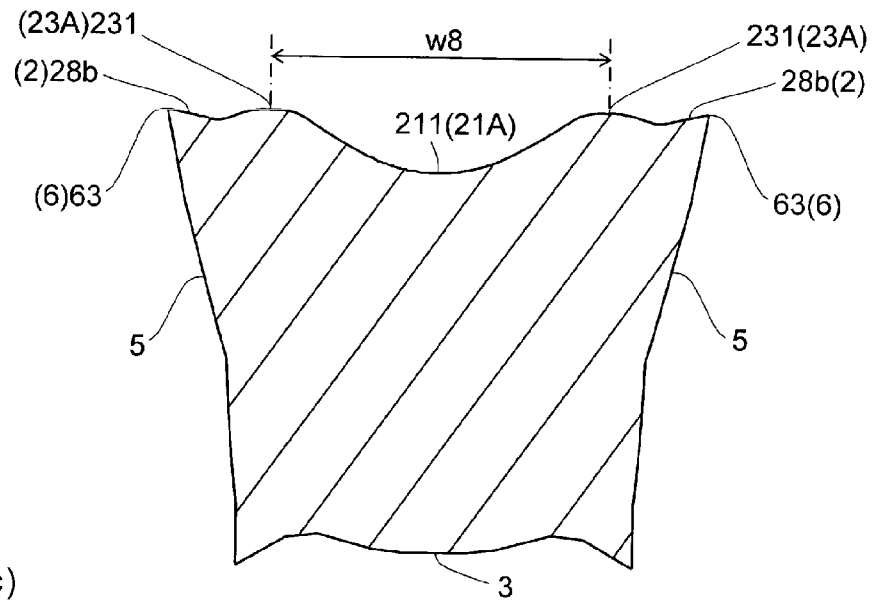
FIG. 19(b) is a sectional view taken along line f-f therein.
Figure 19C:
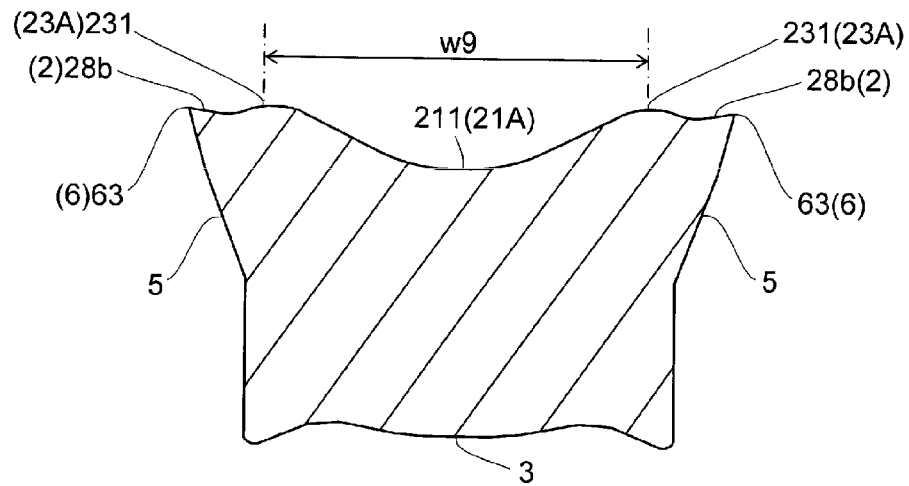
FIG. 19(c) is a sectional view taken along line g-g therein.

In the present embodiment, as shown in FIG. 17, the distance between the pair of protruded parts 23A and 23A located closer to an end surface cutting edge 60 is increased as separating from the end surface cutting edge 60. For example, when distances d4, d5 and d6 from the end surface cutting edge have a relationship of d4<d5<d6 in FIG. 18, cross sections in a surface perpendicular to a lower surface 3 at individual positions, namely, the cross sections perpendicular to the foregoing longitudinal direction are shown in FIG. 19. Specifically, FIG. 19(a) shows the cross section at the position separated by the distance d4 from the first cutting edge 61. FIG. 19(b) shows the cross section at the position separated by the distance d5 from the first cutting edge 61. FIG. 19(c) shows the cross section at the position separated by the distance d6 from the first cutting edge 61. The distance between the pair of protruded parts 23A and 23A shown in FIG. 19(a) is indicated by w7, that in FIG. 19(b) is indicated by w8, and that in FIG. 19(c) is indicated by w9. Hereat, there is a relationship of w7<w8<w9. According to this configuration, the protruded parts 23A extend in a direction to intersect with the second cutting edges 62 and hence function as a breaker wall against the chips generated by the second cutting edges 62 in the shoulder grooving process. Consequently, the curling diameter of the chips generated by the second cutting edges 62 can be satisfactorily controlled to improve the chip discharge performance.

<Cutting Tool>

The inserts 1 and 1A to 1E are usable for all of the internal grooving process, the external grooving process, the cut-off process and the face grooving process as described earlier.

As a cutting tool according to an embodiment of the present invention, the cutting tool 30 with the insert 1 attached thereto is described with reference to FIG. 20, taking for example the case where the insert 1 is used for the face grooving process.

As shown in FIG. 20, the cutting tool 30 of the present embodiment includes the insert 1 and the prism-like shaped holder 31 having a holding part 32 configured to hold the insert 1 at a front end thereof. The insert 1 is attached to the front end of the holder 31 so as to be held in a state that the cutting edge 6 protrudes from the front end of the holding part 32. From the viewpoint of improving durability, the holder 31 and the holding part 32 are integrally formed in the present embodiment. Alternatively, the holding part 32 and the holder 31 may be configured to be detachable from each other. The present embodiment employs a method in which a restraining force is adjustable with a screw 33 disposed at the front end of the holder 31, and the insert 1 is restrained by being pressed from above. This method is exemplified but not limited thereto.

For example, the insert 1 may be attached to the holder 31 as follows. As shown in FIG. 20, firstly, the insert 1 is inserted between an upper jaw 32a and a lower jaw 32b by moving the insert 1 in a direction of arrow V. Then, by fastening the screw 33 thereto, the upper jaw 32a is elastically deformed and held down. As a result, the insert 1 is pressed by the lower jaw 32b and is held fixed between the upper jaw 32a and the lower jaw 32b. In the present embodiment, the holder 31 is provided with a lit 32c, and hence the slit 32c further facilitates the elastic deformation of the upper jaw 32a, thus making it easier to hold down the front end of the upper jaw 32a.

Further, because the cutting tool 30 of the present embodiment is used for the face grooving process, as shown in FIG. 20, the lower jaw 32b is curved along the outer periphery and inner periphery of a machined groove in a front end view. When the lower jaw 32b is formed vertically in the front end view, the lower jaw 32b may contact with the machined groove during a cutting process depending on the dimension of a cutting diameter, because an annular groove is formed in the face grooving process. Hence, the cutting diameter is previously determined, and the lower jaw 32b is curved along the outer periphery and inner periphery of the machined groove.

<Method of Manufacturing Machined Product>

Next, a method of manufacturing a machined product according to an embodiment of the present invention is described below with reference to FIG. 21. The present embodiment illustrates and describes the cutting tool 30.

Figure 21A:
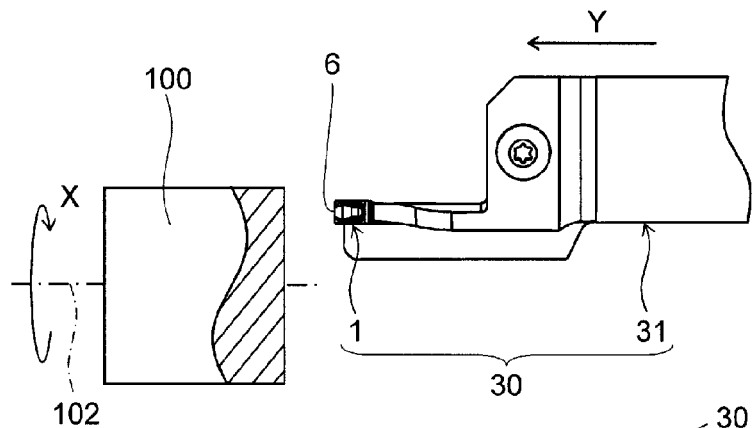
FIGS. 21(a) to 21(d) are schematic diagrams showing a method of manufacturing a machined product according an embodiment of the present invention.
Figure 21B:
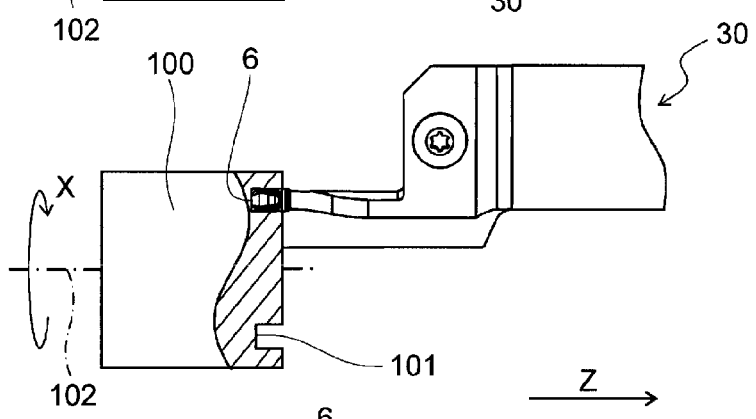
Figure 21C:
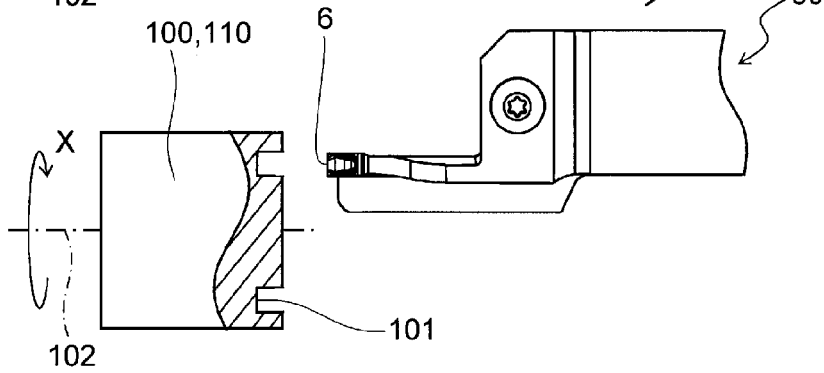
Figure 21D:
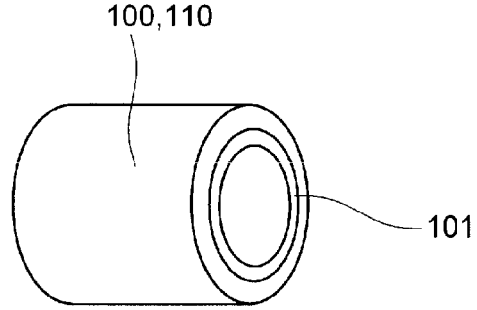

The present embodiment describes the face grooving process, and therefore, an annular groove 101 is formed on an end surface of a workpiece 100, as shown in FIG. 21(d). The workpiece 100 shown in FIGS. 21(a) to 21(c) is partially illustrated in a sectional view.

The method of manufacturing the machined product according to the present embodiment includes the following steps (i) to (iv).

(i) Rotating the substantially column-like shaped workpiece 100 in a direction of arrow X around a rotation axis 102 as shown in FIG. 21(a);

(ii) Bringing the cutting tool 30 near the workpiece 100 being rotated by moving the cutting tool 30 in a direction of arrow Y;

(iii) Cutting the workpiece 100 by bringing the cutting edge 6 of the cutting tool 30 into contact against the workpiece 100 being rotated as shown in FIG. 21(b); and (iv) Separating the cutting tool 30 from the workpiece 100 after subjected to the cutting by moving the cutting tool 30 in a direction of arrow Z as shown in FIG. 21(c).

A machined product 110 as shown in FIG. 21(d) can be obtained through the foregoing manufacturing steps.

In the step (i), the workpiece 100 and the cutting tool 30 may be brought close to each other. For example, the workpiece 100 may be brought close to the cutting tool 30. Similarly, in the step (iv), the workpiece 100 and the cutting tool 30 may be separated from each other. For example, the workpiece 100 may be separated from the cutting tool 30. In the step (iii), a process of forming a groove is performed in the grooving process, and the traversing process is also performed.

When the cutting process is continuously performed, it is required to repeat the step of bringing the cutting edge 6 of the cutting tool 30 into contact against different portions of the workpiece 100, while keeping the rotation of the workpiece 100. In the shoulder grooving process, the steps (i) to (iv) need to be performed so that one end part of the cutting edge 6 is contacted against a corner part formed by the inner wall surface and end surface of the already formed machined groove.

Some examples of the material of the workpiece 100 are carbon steel, alloy steel, stainless steel, cast iron and non-iron metal.

Although the present embodiment has been described using the left-handed holder 31, the right-handed holder 31 is also applicable thereto. Although the present embodiment has been described taking for example the case of using the cutting tool 30 with the insert 1 attached thereto, the cutting tool with any one of the inserts 1A to 1E attached thereto instead of the insert 1 can produce a similar effect.

It is to be understood that the present invention is not limited to the foregoing embodiments, and various changes and modifications can be made therein without departing from the spirit or scope of the present invention.

For example, the pair of protruded parts 23 and 23 have the same configuration in the foregoing embodiments. Alternatively, the pair of protruded parts 23 and 23 may be of different configurations.

It is also noted that the present invention is not limited to the inserts 1 and 1A to 1E according to their corresponding embodiments and the elements of the inserts 1 and 1A to 1E may be combined with each other to configure an insert according to still another embodiment.

The invention claimed is:

1. A cutting insert, comprising:
an upper surface that lies in a plane formed by an X axis and a Y axis, wherein the X axis and the Y axis are orthogonal and also orthogonal to a Z axis;
a lower surface that lies in a plane formed by the X axis and the Y axis and is separated by a distance along the Z axis from the upper surface;
a pair of side surfaces, a left side surface and a right side surface, that lie in a plane formed by the Z axis and the Y axis and are separated by a distance along the X axis and connect the upper and lower surfaces;
a front end surface that lies in a plane formed by the X axis and the Z axis and connects the upper and lower surfaces;
a rear end surface that lies in the plane formed by the X axis and the Z axis that is a distance along the Y axis from the front end surface and connects the upper and lower surfaces, wherein;
the upper, lower, sides, front end, and rear end surfaces form a solid shape;
a first cutting part is located along the front end surface at an intersection of the front end surface and the upper surface, wherein the cutting part is divided into a first cutting edge located in the middle of a pair of second cutting edges, wherein;
the first cutting edge is concave towards a midpoint of the cutting part, wherein;
the upper surface includes a first concave groove which is connected to the first cutting edge and extends towards the rear end surface along the Y axis, a pair of second concave grooves which are respectively connected to the pair of second cutting edges and extend towards the rear end surface along the Y axis, and a pair of protruded parts located between the first concave groove and the pair of second concave grooves respectively,
a pair of second cutting parts located along the pair of side surfaces at the intersection of the pair of side surfaces and the upper surface,
the pair of protruded parts are respectively continuous with the first cutting part and separated from each other by a larger distance therebetween as separating from the first cutting part,
a top portion of each of the pair of protruded parts is inclined so as to slant downwards towards the lower surface as extending towards the rear end surface from the first cutting part in a side view; and
each of the pair of second cutting parts is inclined so as to slant downwards towards the lower surface as extending towards the rear end surface from the first cutting part in a side view, and there is a relationship of $\alpha 1 < \beta 1 < \gamma 1$, where $\alpha 1$ is an angle formed by a top portion of at least one of the pair of protruded parts and a reference plane perpendicular to a central axis extending between the upper surface and the lower surface, $\beta 1$ is an angle formed by at least one of the pair of second cutting parts and the reference plane, and $\gamma 1$ is an angle formed by the first concave groove and the reference plane in a side view or a sectional view parallel to a longitudinal direction.

2. The cutting insert according to claim 1, wherein each of the pair of second cutting edges has a straight line shape in an end surface view, and
a width of each of the pair of second concave grooves is decreased as separating from the pair of second cutting edges in a top view.

3. The cutting insert according to claim 1, wherein each of the pair of second concave grooves is curved so as to protrude toward the pair of side surfaces as separating from the pair of second cutting edges in a top view.

4. The cutting insert according to claim 1, wherein each of the pair of second concave grooves has a curved line shape protruding toward the lower surface in a sectional view perpendicular to the longitudinal direction.

5. The cutting insert according to claim 1, wherein
the upper surface further comprises a curvedly protruded part curved so as to protrude toward a side separated from the first cutting part in a top view, and
an end portion of each of the pair of protruded parts which is located further away from the first cutting part is continuous with the curvedly protruded part.

6. A cutting insert, comprising:
an upper surface that lies in a plane formed by an X axis and a Y axis, wherein the X axis and the Y axis are orthogonal and also orthogonal to a Z axis;
a lower surface that lies in a plane formed by the X axis and the Y axis and is separated by a distance along the Z axis from the upper surface;
a pair of side surfaces, a left side surface and a right side surface, that lie in a plane formed by the Z axis and the Y axis and are separated by a distance along the X axis and connect the upper and lower surfaces;
a front end surface that lies in a plane formed by the X axis and the Z axis and connects the upper and lower surfaces;
a rear end surface that lies in the plane formed by the X axis and the Z axis that is a distance along the Y axis from the front end surface and connects the upper and lower surfaces, wherein;
the upper, lower, sides, front end, and rear end surfaces form a solid shape;
a cutting part is located along the front end surface at an intersection of the front end surface and the upper surface, wherein the cutting part is divided into a first cutting edge located in the middle of a pair of second cutting edges, wherein;
the first cutting edge is concave towards a midpoint of the cutting part, wherein;
the upper surface includes a first concave groove which is connected to the first cutting edge and extends towards the rear end surface along the Y axis, a pair of second concave grooves which are respectively connected to the pair of second cutting edges and extend towards the rear end surface along the Y axis, and a pair of protruded parts located between the first concave groove and the pair of second concave grooves respectively, the pair of protruded parts are respectively continuous with the cutting part and separated from each other by a larger distance therebetween as separating from the cutting part, a top portion of each of the pair of protruded parts is inclined so as to slant downwards towards the lower surface as extending towards the rear end surface from the cutting part in a side view; and the top portion of each of the pair of protruded parts is located at a lower position than an end portion of each of the pair of second cutting edges which is located closer to the pair of side surfaces in a side view.

7. A cutting insert, comprising:

an upper surface that lies in a plane formed by an X axis and a Y axis, wherein the X axis and the Y axis are orthogonal and also orthogonal to a Z axis;

a lower surface that lies in the plane formed by the X axis and the Y axis and is separated by a distance along the Z axis from the upper surface;

a pair of side surfaces, a left side surface and a right side surface, that lie in a plane formed by the Z axis and the Y axis and are separated by a distance along the X axis and connect the upper and lower surfaces;

a front end surface that lies in a plane formed by the X axis and the Z axis and connects the upper and lower surfaces;

a rear end surface that lies in the plane formed by the X axis and the Z axis that is a distance along the Y axis from the front end surface and connects the upper and lower surfaces, wherein;

the upper, lower, sides, front end, and rear end surfaces form a solid shape;

a cutting part is located along the front end surface at an intersection of the front end surface and the upper surface, wherein the cutting part is divided into a first cutting edge located in the middle of a pair of second cutting edges, wherein;

the first cutting edge is concave towards a midpoint of the cutting part, wherein the upper surface includes a first concave groove which is connected to the first cutting edge and extends towards the rear end surface along the Y axis, a pair of second concave grooves which are respectively connected to the pair of second cutting edges and extend towards the rear end surface along the Y axis, and a pair of protruded parts located between the first concave groove and the pair second concave grooves respectively, the pair of protruded parts are respectively continuous with the cutting part and separated from each other by a larger distance therebetween as separating from the cutting part, a top portion of each of the pair of protruded parts is inclined so as to slant downwards towards the lower surface as extending towards the rear end surface from the cutting part in a side view; and each of the pair of protruded parts comprises a pair of descending top portions inclined so as to become closer to the lower surface as separating from the cutting part, and the first concave groove comprises a first region which is located between the pair of descending top portions and has a larger depth as separating from the cutting part in a top view.

8. The cutting insert according to claim 7, wherein each of the pair of descending top portions is located at a lower position than a highest portion of the cutting edge.

9. The cutting insert according to claim 7, wherein an angle formed by straight lines passing through both end portions of a pair of inner wall surfaces in the first region of the first concave groove is decreased as separating from the first cutting edge in a sectional view perpendicular to a longitudinal direction.

10. The cutting insert according to claim 7, wherein each of the pair of protruded parts further comprises an ascending top portion which is continuous with an end portion of the descending top portion located further away from the cutting part and is inclined so as to separate from the lower surface as separating from the cutting part.

11. A cutting tool, comprising:
a cutting insert according to claim 6; and
a holder configured to attach the cutting insert to a front end thereof.

12. A method of manufacturing a machined product, comprising:
rotating a workpiece;
bringing the workpiece being rotated and the cutting edge of the cutting tool according to claim 11 into contact with each other; and
separating the cutting tool and the workpiece from each other.

13. The cutting insert according to claim 6, wherein each of the pair of second cutting edges has a straight line shape in an end surface view, and
a width of each of the pair of second concave grooves is decreased as separating from the pair of second cutting edges in a top view.

14. The cutting insert according to claim 7, wherein each of the pair of second cutting edges has a straight line shape in an end surface view, and
a width of each of the pair of second concave grooves is decreased as separating from the pair of second cutting edges in a top view.

15. A cutting tool, comprising:
a cutting insert according to claim 1; and
a holder configured to attach the cutting insert to a front end thereof.

16. A method of manufacturing a machined product, comprising:
rotating a workpiece;
bringing the workpiece being rotated and the cutting edge of the cutting tool according to claim 15 into contact with each other; and
separating the cutting tool and the workpiece from each other.

17. A cutting tool, comprising:
a cutting insert according to claim 7; and
a holder configured to attach the cutting insert to a front end thereof.

18. A method of manufacturing a machined product, comprising:
rotating a workpiece;
bringing the workpiece being rotated and the cutting edge of the cutting tool according to claim 17 into contact with each other; and
separating the cutting tool and the workpiece from each other.

* * * * *